US011852956B2

(12) United States Patent
Grant et al.

(10) Patent No.: US 11,852,956 B2
(45) Date of Patent: *Dec. 26, 2023

(54) CAMERA SYSTEM

(71) Applicant: Portable Multimedia Ltd, West End (GB)

(72) Inventors: Robert George Grant, West End (GB); Graham Keith Lambert, West End (GB)

(73) Assignee: Portable Multimedia Ltd

( * ) Notice: Subject to any disclaimer, the term of this patent is extended or adjusted under 35 U.S.C. 154(b) by 354 days.

This patent is subject to a terminal disclaimer.

(21) Appl. No.: 17/184,051

(22) Filed: Feb. 24, 2021

(65) Prior Publication Data

US 2021/0181600 A1 Jun. 17, 2021

Related U.S. Application Data

(62) Division of application No. 16/250,260, filed on Jan. 17, 2019, now Pat. No. 11,009,776.

(30) Foreign Application Priority Data

Jan. 22, 2018 (GB) ..................... 1801002

(51) Int. Cl.
*G03B 17/02* (2021.01)
*B60R 11/04* (2006.01)
(Continued)

(52) U.S. Cl.
CPC .............. *G03B 17/02* (2013.01); *B60R 11/04* (2013.01); *G03B 17/56* (2013.01); *H04N 1/2158* (2013.01);
(Continued)

(58) Field of Classification Search
CPC ........ G03B 17/02; G03B 16/56; H04N 23/51; H04N 1/2158; H04N 2201/0084; B60R 11/04
See application file for complete search history.

(56) References Cited

U.S. PATENT DOCUMENTS

| 8,520,070 | B1 | 8/2013 | Englander et al. |
| 11,009,776 | B2* | 5/2021 | Grant ............... B60R 11/04 |
| 2016/0360076 | A1 | 12/2016 | Stark et al. |

FOREIGN PATENT DOCUMENTS

| CN | 104590121 A | 5/2015 |
| JP | 2008112678 A | 5/2008 |

(Continued)

OTHER PUBLICATIONS

Examination report for GB Application No. GB1801002.5 dated Mar. 30, 2020; 3 pages.

(Continued)

*Primary Examiner* — Clayton E. LaBalle
*Assistant Examiner* — Diana Hancock
(74) *Attorney, Agent, or Firm* — Lerner David LLP

(57) ABSTRACT

The present invention relates to a camera system, comprising: a camera operative to capture an image, said camera comprising a power input port for coupling to a power supply assembly; a housing for supporting said camera, said housing comprising an opening, wherein said opening is arranged to provide access to said power input port; a removable panel engageable to said housing to cover said opening by a security fastener to secure said removable panel to said housing in a cover configuration, said removable panel comprising a formation for engaging with at least one portion of said power supply assembly in said cover configuration to restrain movement of said power supply assembly to maintain a coupled arrangement of said power (Continued)

supply assembly and said power input port in said cover configuration.

8 Claims, 24 Drawing Sheets

(51) Int. Cl.
    *H04N 23/51*     (2023.01)
    *G03B 17/56*     (2021.01)
    *H04N 1/21*     (2006.01)

(52) U.S. Cl.
    CPC ..... *H04N 23/51* (2023.01); *H04N 2201/0084* (2013.01)

(56) References Cited

FOREIGN PATENT DOCUMENTS

| | | |
|---|---|---|
| JP | 2018180142 A | 11/2018 |
| WO | 2016174251 A1 | 11/2016 |

OTHER PUBLICATIONS

Extended European Search Report including Written Opinion for EP19150089.1 dated Apr. 3, 2019; 8 pages.
International Search Report including Written Opinion for PCT/GB2019/050006 dated Mar. 25, 2019; 10 pages.
Search Report for GB Application No. 1801002.5 dated Jul. 16, 2019; 1 page.

* cited by examiner

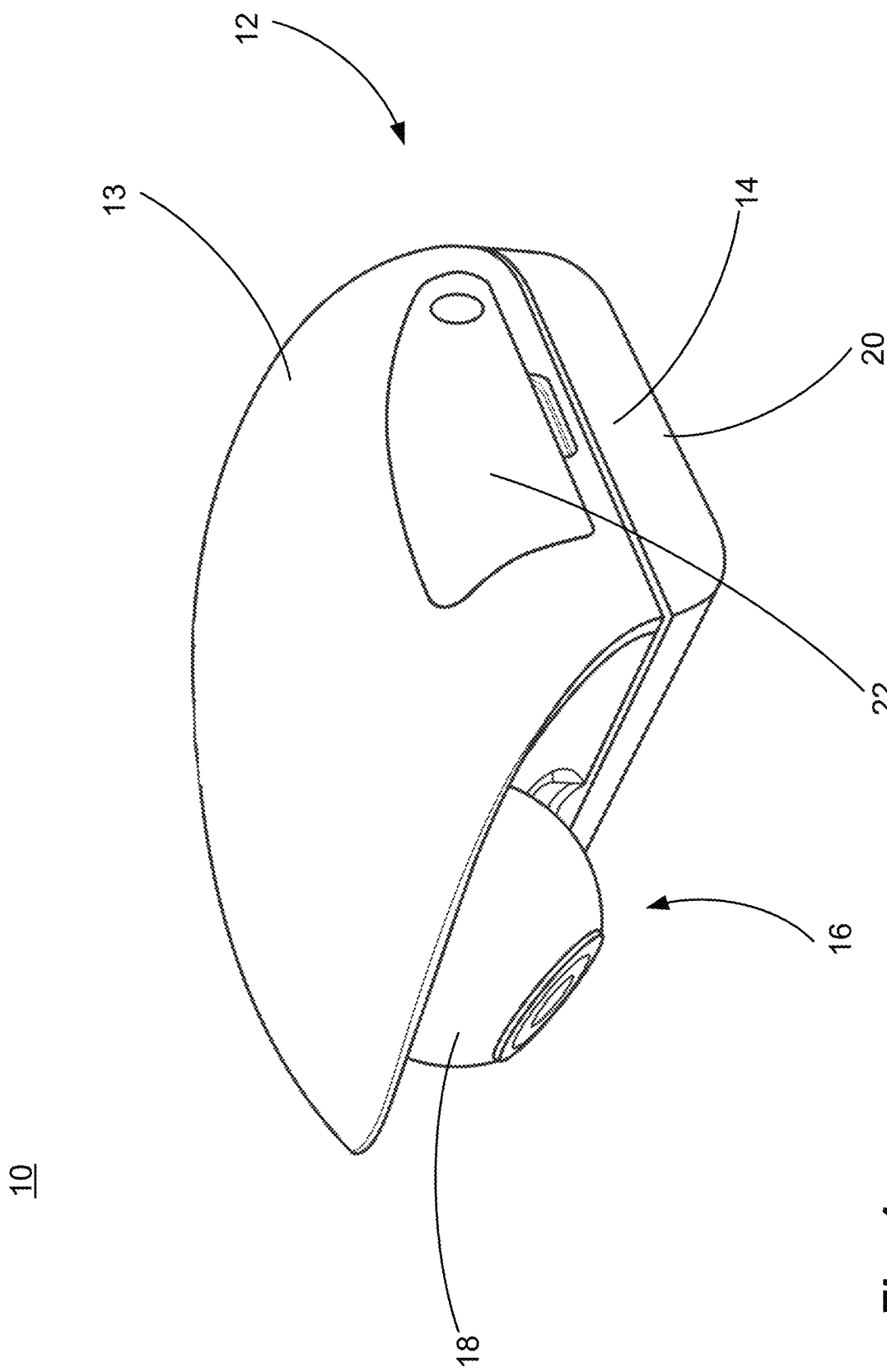

CAMERA SYSTEM

CROSS-REFERENCE TO RELATED APPLICATIONS

This application is a divisional of pending U.S. application Ser. No. 16/250,260, filed on Jan. 17, 2019, which claims priority from U.K. Patent Application No. GB 1801002.5 filed on Jan. 22, 2018, all of which are hereby incorporated herein by reference.

FIELD

The present invention relates to a camera system for a vehicle and, in particular, but not exclusively, to a camera system comprising a tamper-inhibiting housing.

BACKGROUND

Camera systems for vehicles such as, for example, on-board camera systems, dashboard cameras ("dashcams"), in-vehicle systems, etc. are increasing in use and popularity as a means to capture images of an area around a vehicle. Images captured by such systems may be used as evidence in the case of an accident, damage, or the like. Often, such camera systems are configured to continuously record video footage of a view through a windscreen of a vehicle in which they are mounted. Such camera systems may be attached to the interior of the vehicle windscreen or to the top of the dashboard of the vehicle.

Some known camera systems are operative to capture an image, a sequence of images, and/or record video footage when the vehicle is started, responsive to a user input, and/or automatically responsive to detection of movement of the vehicle.

Known camera systems typically capture image and/or video data in a cyclic buffered manner, i.e. regularly recording and overwriting data when the data is no longer relevant, for example after a period of time deemed to be sufficiently long for the data not to comprise relevant data, and storing a segment of the buffered data securely on a memory device responsive to a dangerous event e.g. a collision.

Such camera systems are being increasingly used not only in personal vehicles, but also in commercial fleet vehicles such as, for example, taxis, delivery vehicles, etc., i.e. where more than one driver may have access to and/or use of the vehicle. In such non-private, commercial environments, business owners may wish to monitor driving habits of personnel when using such vehicles. It may be desirable in such environments to prevent access to a camera system in order to prevent tampering with recorded image/video data and/or to prevent tampering with an image capture function, or a recording function, of such a camera system. Likewise, insurance companies may wish to monitor driving habits of insured persons or driving insured vehicles whether in a commercial fleet or for private use.

Aspects and embodiments of the present invention have been devised with the foregoing in mind.

SUMMARY

According to an aspect of the present invention, there is provided a camera system, comprising: a camera operative to capture an image, the camera comprising a power input port for coupling to a power supply assembly; a housing for supporting the camera, the housing comprising an opening, wherein the opening is arranged to provide access to the power input port; a removable panel engageable to the housing to cover the opening by a security fastener to secure the removable panel to the housing in a cover configuration, the removable panel comprising a formation for engaging with at least one portion of the power supply assembly in the cover configuration to restrain movement of the power supply assembly to maintain a coupled arrangement of the power supply assembly and the power input port in the cover configuration.

Securing the removable panel to the housing, by way of a security fastener, to cover the opening via which a power supply assembly can enter the housing (to be coupled to a power input port of the camera) may inhibit and/or frustrate attempts to tamper with the camera system (i.e. an attempt to prevent the camera from capturing image date by disconnecting the camera from a power supply).

Optionally, the formation may comprise a first formation for engaging with a power cable portion of the power supply assembly. Further optionally, the first formation may comprise a yoke comprising a channel through which the power cable portion can pass, and a securing point via which the first formation can be fixed to a securing point on the housing by the security fastener to form the cover configuration, wherein surfaces of the channel and the security fastener are engageable with the power cable portion in the cover configuration.

Engagement of the first formation with the power cable portion, or combination of the surfaces of the channel and of the security fastener acting on the power cable portion may effectively form a cable-grip, which may inhibit and/or frustrate attempts to disconnect the power supply assembly from the camera by way of pulling, or tugging, on the power cable portion.

Optionally, a surface of the yoke is configured to abut a cable-end region of an electro-mechanical connector portion of the power supply assembly.

Abutment of the surface of the yoke with the cable-end region of the electro-mechanical connector portion may prevent movement of the electro-mechanical connector relative to the power input port (e.g. caused by pulling, or tugging, on the power cable portion) and may further inhibit and/or frustrate attempts to disconnect the power supply assembly from the power input port.

Optionally, the formation may comprise a second formation for engaging with an electro-mechanical connector portion of the power supply assembly. Further optionally, the second formation may comprise at least one surface complementary in form to at least one surface of the electro-mechanical connector portion, the second formation configured to abut a corresponding the at least one surface of the electro-mechanical connector portion. Yet further optionally, a first surface of the second formation may be configured to abut a first surface at, or adjacent to, a cable-end region, or the cable-end region, of the electro-mechanical connector portion and a second surface of the second formation may be configured to abut a second surface of the electro-mechanical connector portion.

This may further limit movement of the electro-mechanical connector portion relative to the power input port and may provide another means to inhibit and/or frustrate attempts to disconnect the power supply assembly from the power input port.

Optionally, the removable panel may be engageable to the housing to cover the opening by cooperative engagement of complementary engagement elements on the removable panel and on the housing.

This arrangement may be provided as an engagement arrangement between the panel and the housing that may supplement engagement arrangement between security fastener, panel and housing.

According to another aspect of the present invention there is provided a camera system, comprising: a camera operative to capture an image, the camera comprising a power input port for coupling to a power supply assembly and a data storage device port for receiving a removable data storage device; a housing for supporting the camera, the housing comprising a first opening and a second opening, wherein the first opening is arranged to provide access to the data storage device port and the second opening is arranged to provide access to the power input port; a first removable panel engageable to the housing to cover the first opening by a security fastener to secure the first removable panel to the housing in a cover configuration; and a second removable panel engageable to the housing to cover the second opening by a security fastener to secure the second removable panel to the housing in a cover configuration, the second removable panel comprising a formation for engaging with a portion of the power supply assembly in the cover configuration to restrain movement of the power supply assembly to maintain a coupled arrangement of the power supply assembly and the power input port in the cover configuration.

Securing the first removable panel to the housing, by way of a security fastener, to cover the opening via which a removable data storage device can be inserted into a data storage device port (or removed therefrom) may inhibit and/or frustrate attempts to tamper with the camera system (i.e. an attempt to prevent the camera from capturing image date by removing a data storage device, or damaging a data storage device to prevent captured data being stored thereon).

Securing the second removable panel to the housing, by way of a security fastener, to cover the opening via which a power supply assembly can enter the housing (to be coupled to a power input port of the camera) may inhibit and/or frustrate attempts to tamper with the camera system (i.e. an attempt to prevent the camera from capturing image date by disconnecting the camera from a power supply).

Optionally, the formation may comprise a first formation for engaging with a power cable portion of the power supply assembly. Further optionally, the first formation may comprise a yoke comprising a channel through which the power cable portion can pass, and a securing point via which the first formation can be fixed to a securing point on the housing by the security fastener to form the cover configuration, wherein surfaces of the channel and the security fastener are engageable with the power cable portion in the cover configuration.

Engagement of the first formation with the power cable portion, or combination of the surfaces of the channel and of the security fastener acting on the power cable portion may effectively form a cable-grip, which may inhibit and/or frustrate attempts to disconnect the power supply assembly from the camera by way of pulling, or tugging, on the power cable portion.

Optionally, a surface of the yoke is configured to abut a cable-end region of an electro-mechanical connector portion of the power supply assembly.

Abutment of the surface of the yoke with the cable-end region of the electro-mechanical connector portion may prevent movement of the electro-mechanical connector relative to the power input port (e.g. caused by pulling, or tugging, on the power cable portion) and may further inhibit and/or frustrate attempts to disconnect the power supply assembly from the power input port.

Optionally, the formation may comprise a second formation for engaging with an electro-mechanical connector portion of the power supply assembly. Further optionally, the second formation may comprise at least one surface complementary in form to at least one surface of the electro-mechanical connector portion, the second formation configured to abut a corresponding the at least one surface of the electro-mechanical connector portion. Yet further optionally, a first surface of the second formation may be configured to abut a first surface at, or adjacent to, a cable-end region, or the cable-end region, of the electro-mechanical connector portion and a second surface of the second formation may be configured to abut a second surface of the electro-mechanical connector portion.

This may further limit movement of the electro-mechanical connector portion relative to the power input port and may provide another means to inhibit and/or frustrate attempts to disconnect the power supply assembly from the power input port.

Optionally, the housing may further comprise a third opening arranged to provide access to camera control buttons of the camera, and further wherein the camera system comprises a third removable panel engageable to the housing to cover the third opening by a security fastener to secure the third removable panel to the housing in a cover configuration.

Securing the first removable panel to the housing, by way of a security fastener, to cover the opening via which camera control buttons may be accessed may inhibit and/or frustrate attempts to tamper with the camera system (i.e. an attempt to prevent the camera from capturing image date by turning the camera off and/or by resetting the camera).

Optionally, the housing may comprise a first part and a second part. Image capture features, processing features and/or capture image data storage device(s) may be located in one part and power supply features may be located in the other part.

Optionally, the first part of the housing may be coupleable to the second part of the housing by cooperative engagement of complementary engagement elements on the first part and on the second part. Further optionally, the first part may be securely coupleable to the second part by way of at least one security fastener configured to interact with complementary engagement elements on the first part and the second part.

Access to a security fastener coupling a security panel to a respective one of the parts may only be possible after the first and second parts are uncoupling of the first and second parts. This may further inhibit and/or frustrate attempts to tamper with the camera system (e.g. to prevent data relating to a user's driving behaviour being captured and/or to damage or erase existing captured data), whether that be an attempt to remove a data storage device or interfere with the storage device, or data stored thereon, or an attempt to uncouple the camera system from a power source.

Optionally, the second opening and the power input port may be located in the second part. Further optionally, the first opening and the data storage device port may be located in the first part. Yet further optionally, the third opening and the camera control buttons may be located in the first part.

Optionally, at least one security fastener may be insertable into the first part via the first opening to interact with the complementary engagement elements. Further optionally, at least one security fastener may be insertable into the first part via the third opening to interact with the complementary engagement elements.

Optionally, the security fastener may comprise a non-standard actuation formation for accommodating a non-standard drive bit. The term "non-standard" is used to convey that a special tool is required to drive the fastener—i.e. not just a slot in the head of the fastener that can accommodate any blade (e.g. a flat-head screwdriver), nor a cross-recess head (e.g. Phillips® or Pozidriv® head), or a hexagonal head or aperture, for accommodating tools having those types of head. All fasteners having heads of this type are ubiquitous and so are the tools for them. Instead the fasteners may have heads with, obscure, non-standard, tamper-inhibiting formations such as, for example: a Bristol spline screw drive formation; a line screw drive formation; a one-way screw drive formation; a pentalobe screw drive formation; a polydrive screw drive formation; a protruding obstacle screw drive formation; spanner screw drive formation; 12-spline flange screw drive formation; cruciform screw drive formation; TA screw drive formation; TP3 screw drive formation; tri-point screw drive formation; tri-groove screw drive formation; and/or a tri-wing screw drive formation.

Optionally, the security fastener to secure the first removable panel to the housing in a cover configuration and the security fastener to secure the second removable panel to the housing in a cover configuration may comprise different non-standard actuation formations. Further optionally, the security fastener to secure the third removable panel to the housing in a cover configuration may comprise a different non-standard actuation formation to that of the security fastener to secure the first removable panel to the housing in a cover configuration and/or that of the security fastener to secure the second removable panel to the housing in a cover configuration. Yet further optionally, at least one security fastener configured to interact with complementary engagement elements on the first part and the second part may comprise a different non-standard actuation formation to that of the security fastener to secure the first removable panel to the housing in a cover configuration and/or that of the security fastener to secure the second removable panel to the housing in a cover configuration and/or that of the security fastener to secure the third removable panel to the housing in a cover configuration. Still further optionally, a first one of the at least one security fasteners configured to interact with complementary engagement elements on the first part and the second part may comprise a different non-standard actuation formation to that of a second one of the at least one security fasteners configured to interact with complementary engagement elements on the first part and the second part.

Optionally, at least one of the first and second removable panels may be engageable to the housing to cover the first and/or second opening by cooperative engagement of complementary engagement elements on the at least one of the first and second removable panels and on the housing. Further optionally, the third removable panel may be engageable to the housing to cover the third opening by cooperative engagement of complementary engagement elements on the third removable panel and on the housing.

BRIEF DESCRIPTION OF THE DRAWINGS

One or more specific embodiments in accordance with aspects of the present invention will be described, by way of example only, and with reference to the following drawings in which:

FIG. 1a illustrates an isometric view of a first side of a camera system according to one or more embodiments of the present invention;

DETAILED DESCRIPTION OF CERTAIN EMBODIMENTS

Figure 1B:
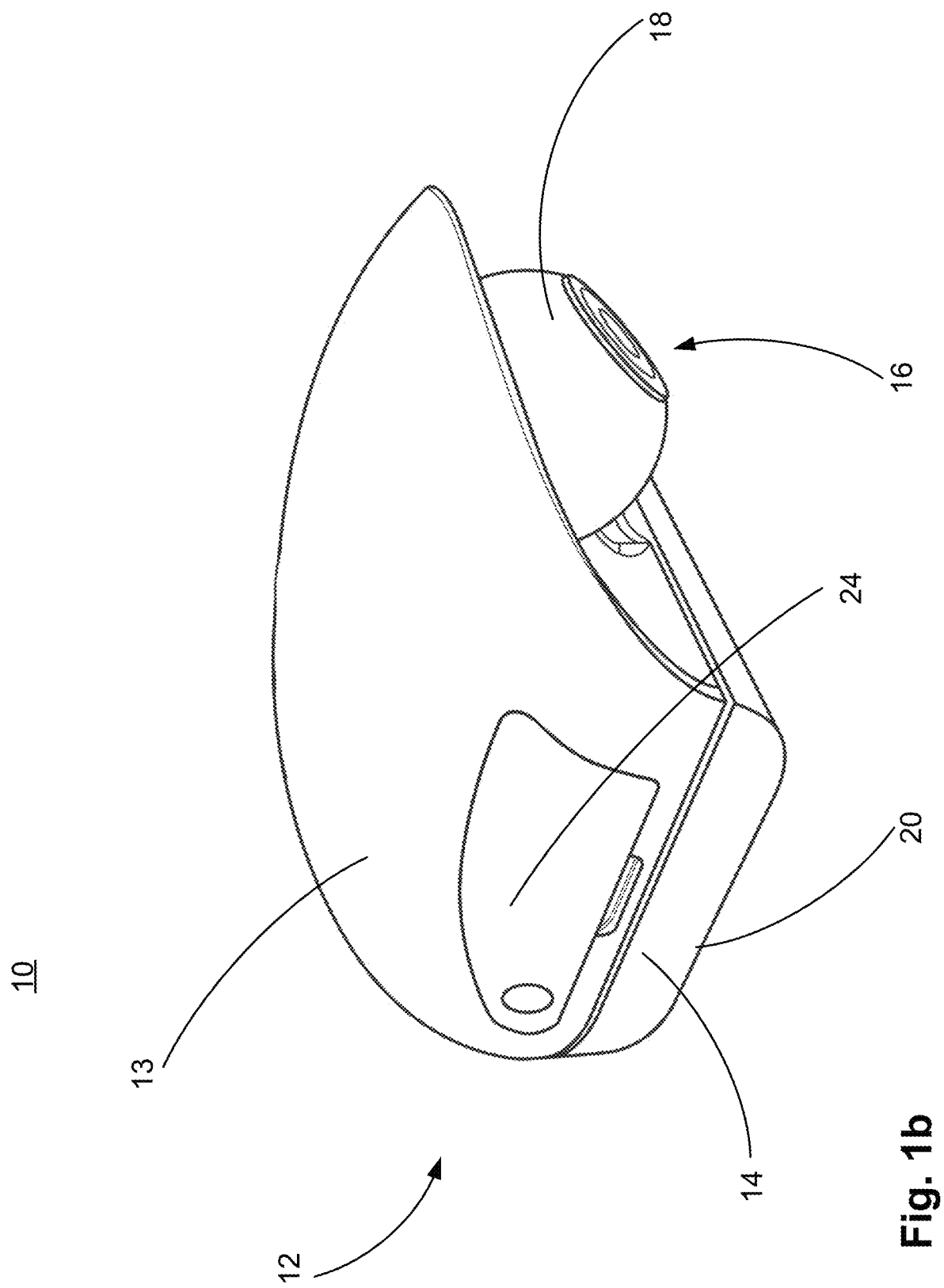
FIG. 1b illustrates an isometric view of a second side of the camera system according to one or more embodiments of the present invention.

FIG. 1a illustrates a camera system 10 viewed from an end and a first side. The camera system 10 comprises a housing 12. The housing 12 comprises two parts: a first part 13; and a second part 14, for supporting a camera 16. In all figures of this specification, only a part of camera 16 is shown extending from first part 13 of housing 12. Greater, or fewer, features of camera 16 may be disposed outside of housing 12 in optional arrangements of the present invention (i.e. non-illustrated arrangements).

In the illustrated one or more embodiments, the portion of the camera 16 visible in the figures comprises a lens unit 18.

In one or more embodiments, some components of camera 16 are located within first part 13 of housing 12 and remaining components of camera 16 are located within second part 14 of housing 12.

In the illustrated one or embodiments, user controls and image processing components of the camera 16 are contained within first part 13 of housing 12. Those components relating to a power supply for the camera 16 are contained within second part 14 of housing 12.

First part 13 of housing 12 is coupleable to second part 14 by way of cooperation of coupling elements located on the first part 13 with complementary coupling elements located on the second part 14.

A surface 20 of the second part 14 (i.e. the surface of the second part 14 on an opposite side of the surface of second part 14 that abuts a portion of the first part 13) is configured for mounting against an inside of a vehicle windscreen and/or against a region of a vehicle dashboard. The surface 20 may be provided with an adhesive substrate for this purpose.

The first and second parts 13, 14 of housing 12 each comprise at least one opening therein via which access is possible to parts of camera 16. In FIG. 1*a* one of the openings (i.e. an opening in first part 13) is covered by a removable panel 22. The removable panel 22 can be securely attached to the first part 13 of housing 12 to cover the opening to prevent access to some parts of the camera 16 via the opening, i.e. the removable panel 22 is locked in place.

In a particular example, the removable panel 22 is attached to the first part 13 of the housing 12 by way of a security fastener. That is, a fastener requiring a specialized tool for removal. In this way, unauthorized access to some features of the camera 16 may be prevented, because only those authorized to access features of the camera will have access to a tool to remove the security fastener.

Optionally, or additionally, the removable panel 22 may also be attached to the first part 13 of the housing 12 by cooperative engagement of complementary engagement elements on said removable panel 22 and on said first part 13. For example, a snap-fit arrangement.

FIG. 1*b* illustrates the camera system 10 viewed from an end and a second, opposite side.

Another removable panel 24 is securely attachable to the first part 13 of housing 12 to cover another opening in the first part 13 of housing 12 on the second side. Removable panel 24 can be attached to the first part 13 of housing 12 in a similar manner to removable panel 22.

Figure 1C:
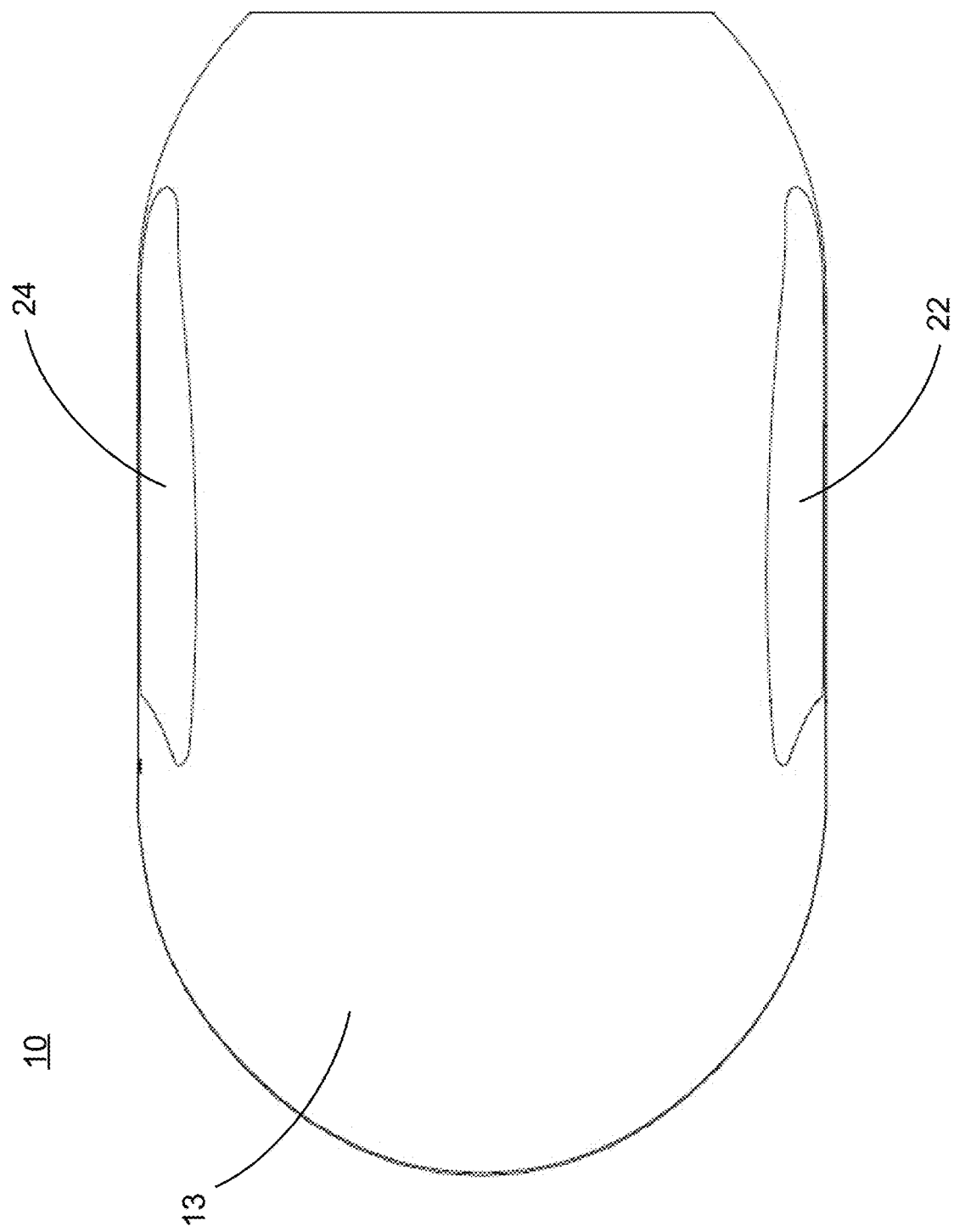
FIG. 1c illustrates a top plan view of the camera system according to one or more embodiments of the present invention.

FIG. 1*c* illustrates a top plan view of the camera system 10 and shows the first part 13 of housing 12, removable panel 22 and removable panel 24.

Figure 1D:
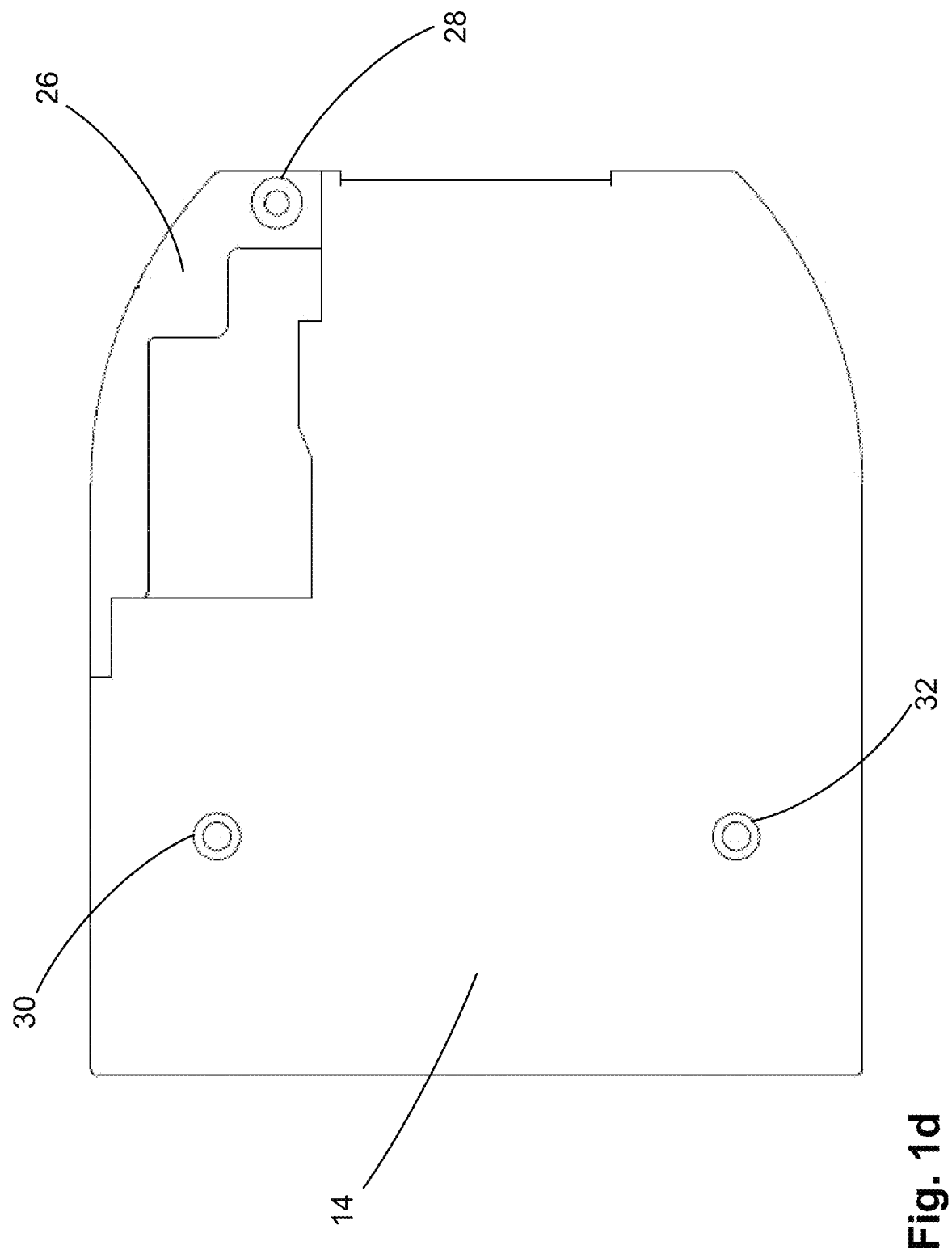
FIG. 1d illustrates a top plan view of a mount of the camera system according to one or more embodiments of the present invention.

FIG. 1*d* illustrates a top plan view of the second part 14 of housing 12 (i.e. of the "top" of the second part 14—a surface for mounting against an underside of the first part 13).

Yet another removable panel 26 is securely attachable to the second part 14 to cover another one of the at least one openings in housing 12. Removable panel 26 can be attached to second part 14 of housing 12 in a similar manner to the manner in which removable panels 22 and 24 are attached to the first part 13 of housing 12. In this regard, removable panel 26 comprises an aperture 28 that, when removable panel 26 is located in a cover configuration with respect to second part 14 of housing 12, aligns with a similar aperture (not shown) in the second part 14 so that a security fastener can pass through aperture 28 to be received in corresponding aperture in the second part 14.

The "top" surface of the second part 14 of the housing 12 also comprises coupling elements 30, 32 for cooperative engagement with corresponding coupling elements of the first part 13 of the housing 12. In the illustrated examples, coupling elements of the second part 14 comprise pins for receipt in corresponding apertures in the first part 13. Of course, the locations of these coupling elements could be reversed and so the first part 13 may comprise pins for receipt in corresponding apertures in the second part 14.

Figure 2A:
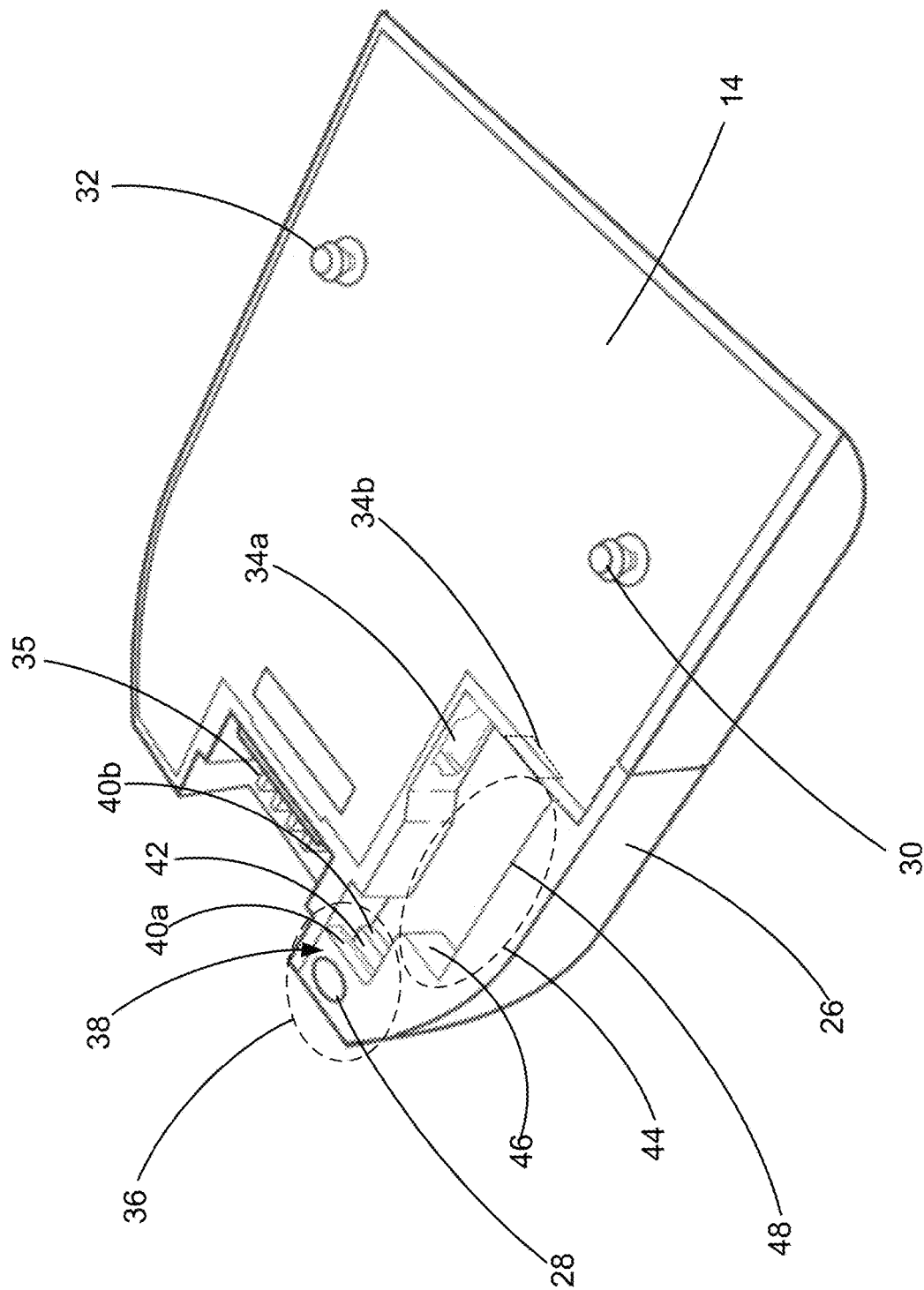
FIG. 2a illustrates a removable panel of a housing of the camera system and a second part of the housing of the camera system.

FIG. 2*a* illustrates a perspective view of a "top" surface of the second part 14 of the housing 12 (i.e. the surface for mounting against a "bottom" surface of first part 13).

Second part 14 of housing 12 comprises a power input port aperture 34*a* via which a power supply assembly can be coupled to a power input port of the part of the camera housed within second part 14 of housing 12. The power input port aperture 34*a* is configured to allow a portion of an electro-mechanical connector portion of the power supply assembly to pass therethrough so as to be electro-mechanically coupled to the power input port of the camera. Power input port aperture 34*a* may be convenient for receiving a portion of an electro-mechanical connector portion of a power supply assembly where the electro-mechanical connector portion is of an "elbow" type, i.e. one end of the connector portion is at an angle (e.g. 90 degrees) to another end of the connector portion.

Optionally, or additionally, the second part 14 of housing 12 may comprise a power input port aperture 34*b* via which a power supply assembly can be coupled to a power input port of the part of the camera housed within second part 14 of housing 12. The power input port aperture 34*b* is configured to allow a portion of an electro-mechanical connector portion of the power supply assembly to pass therethrough so as to be electro-mechanically coupled to the power input port of the camera. Power input port aperture 34*b* may be convenient for receiving a portion of an electro-mechanical connector portion of a power supply assembly where the electro-mechanical connector portion is of a "straight" type, i.e. one end of the connector portion is in-line with another end of the connector portion.

Power received in the part of the camera housed in the second part 14 of the housing 12 is transferred to camera components located in the first part 13 of the housing 12 by way of an electro-mechanical coupling 35 configured to couple with a complementary coupling feature on the first part 13.

An inner surface of removable panel 26 comprises a first formation 36, which comprises a yoke 38. The yoke 38 comprises two arms 40*a*, 40*b* between which there is a channel 42. A power cable portion of the power supply assembly can pass between the two arms 40*a*, 40*b* via channel 42.

The inner surface of the removable panel 26 also comprises a second formation 44, which comprises a first surface 46 and a second surface 48. The second formation is configured to abut a corresponding at least one surface of the electro-mechanical connector portion of power supply assembly.

The first surface 46 is configured to be complementary in form to at least one surface of the electro-mechanical connector portion of the power supply assembly. The second surface 48 is configured to be complementary in form to at least one surface of the electro-mechanical connector portion of the power supply assembly.

In a particular arrangement, to be discussed further below, the first surface 46 of the second formation 44 is configured to abut a first surface at, or adjacent to, a cable-end region of the electro-mechanical connector portion of the power supply assembly. The second surface 48 of the second formation 44 is configured to abut a second surface of the electro-mechanical connector portion of the power supply assembly.

Figure 2B:
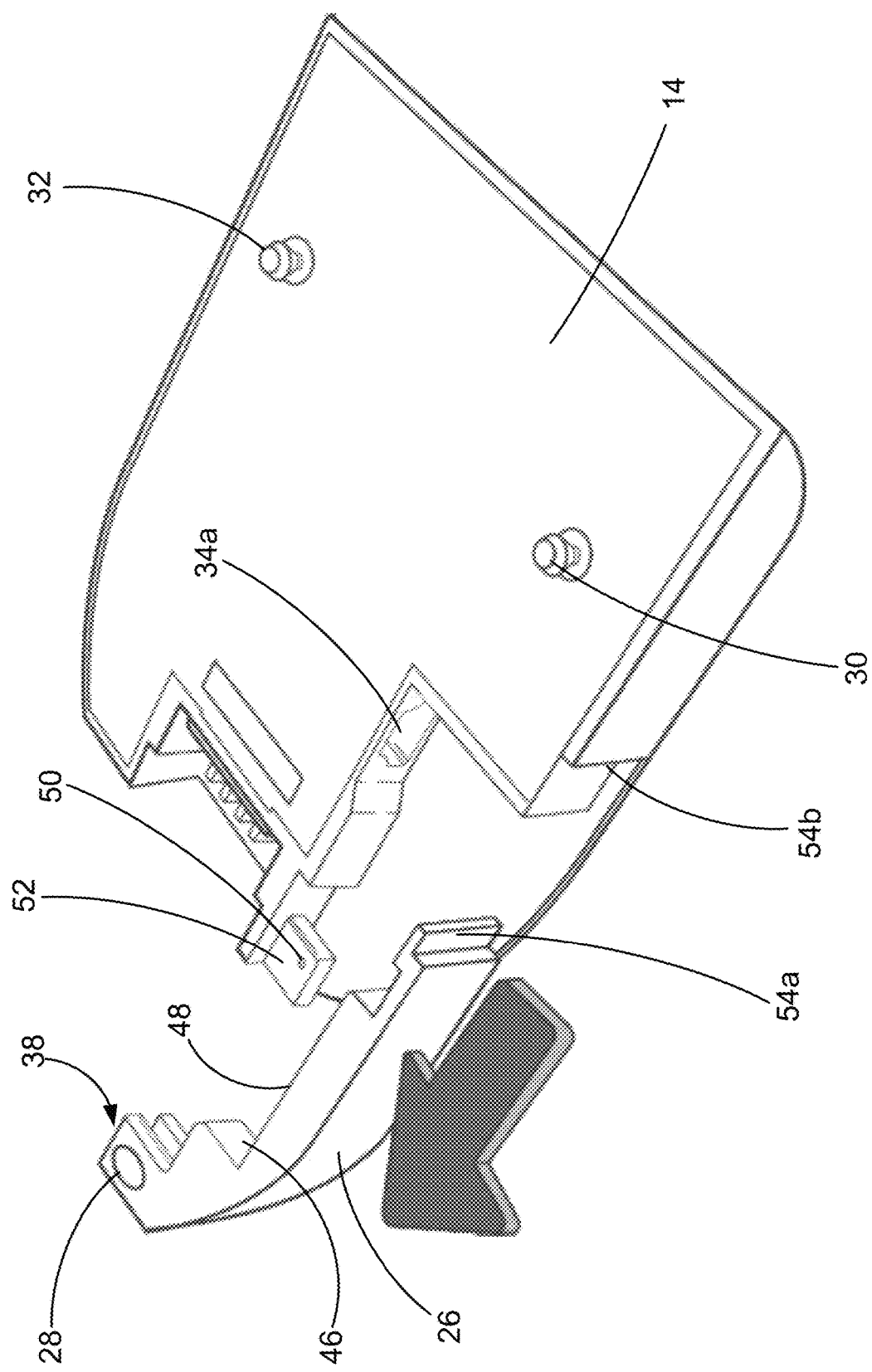
FIG. 2b illustrates a stage of removing the removable panel from the second part of the housing.

FIG. 2b illustrates the second part 14 of the housing 12 of the camera system where a security fastener has been removed to allow the removable panel 26 to be removed from the housing.

A first end of the removable panel 26 can be attached to the second part 14 of housing 12 by means of a security fastener that passes through aperture 28 to engage with an aperture 50 in a securing point 52 of the second part 14 of the housing. A second end of the removable panel can be coupled to the second part 14 of housing by way of a set of features configured to interlock, i.e. a first interlocking component 54a at the second end of the removable panel 26 for engagement with a complementary component 54b in the second part 14 of the housing. For example a tongue and groove arrangement. In particular, the set of features configured to interlock may comprise a snap-fit arrangement.

Figure 2C:
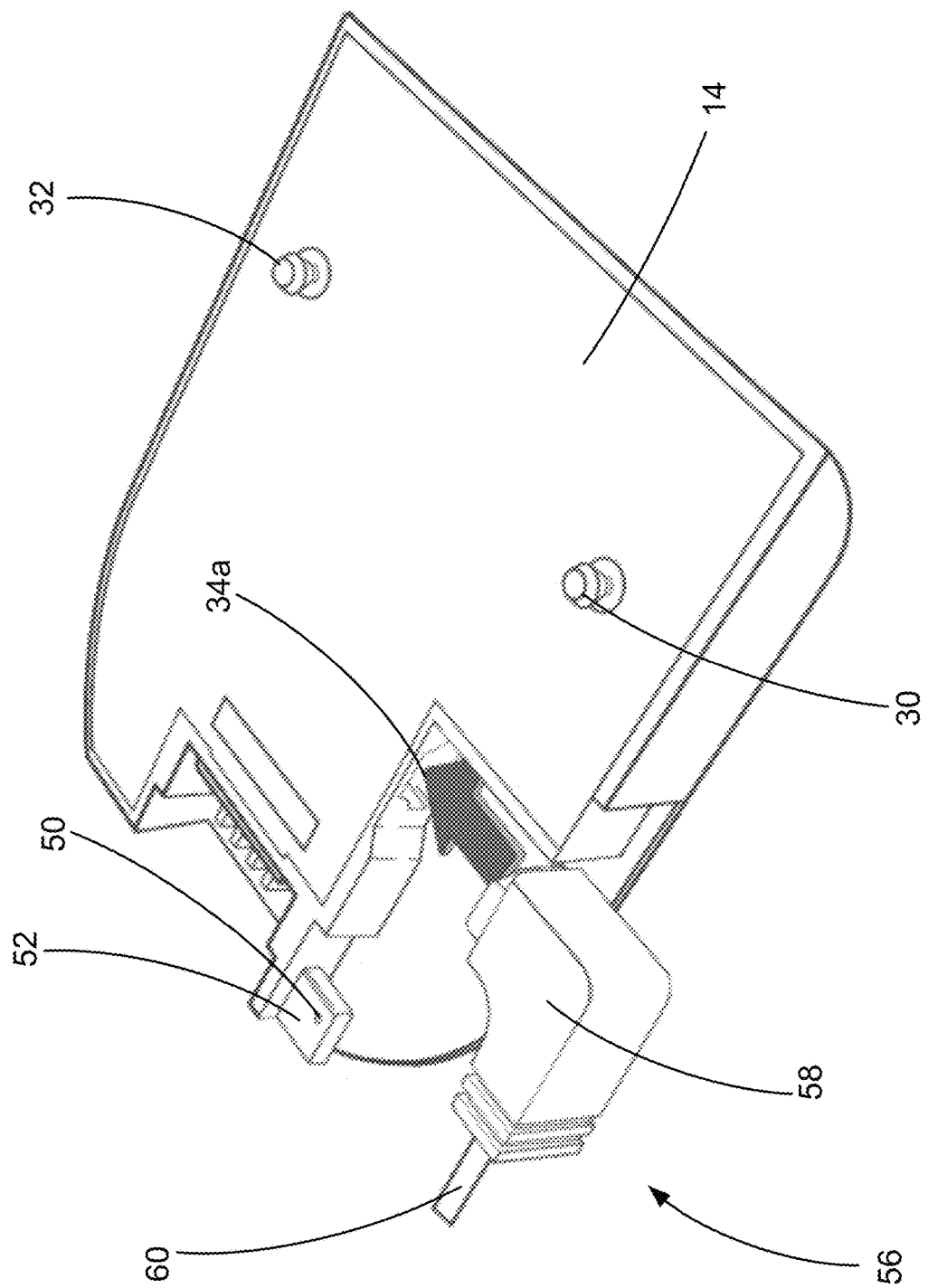
FIG. 2c illustrates a stage of coupling a power supply assembly of a first type to the second part of the housing.

FIG. 2c illustrates the second part 14 of the housing 12 of the camera system with the removable panel 26 removed. With the removable panel 26 removed, a power supply assembly 56, comprising an electro-mechanical connector portion 58 and a power cable portion 60 can be brought into proximity with the power input port aperture 34a. Movement of the power supply assembly 56 in a direction indicated by the arrow in the figure can allow a portion of the electro-mechanical connector portion 58 to pass through the power input port aperture 34 so as to be in a coupled arrangement with a power input port of the part of the camera housed within second part 14 of housing 12.

Figure 2D:
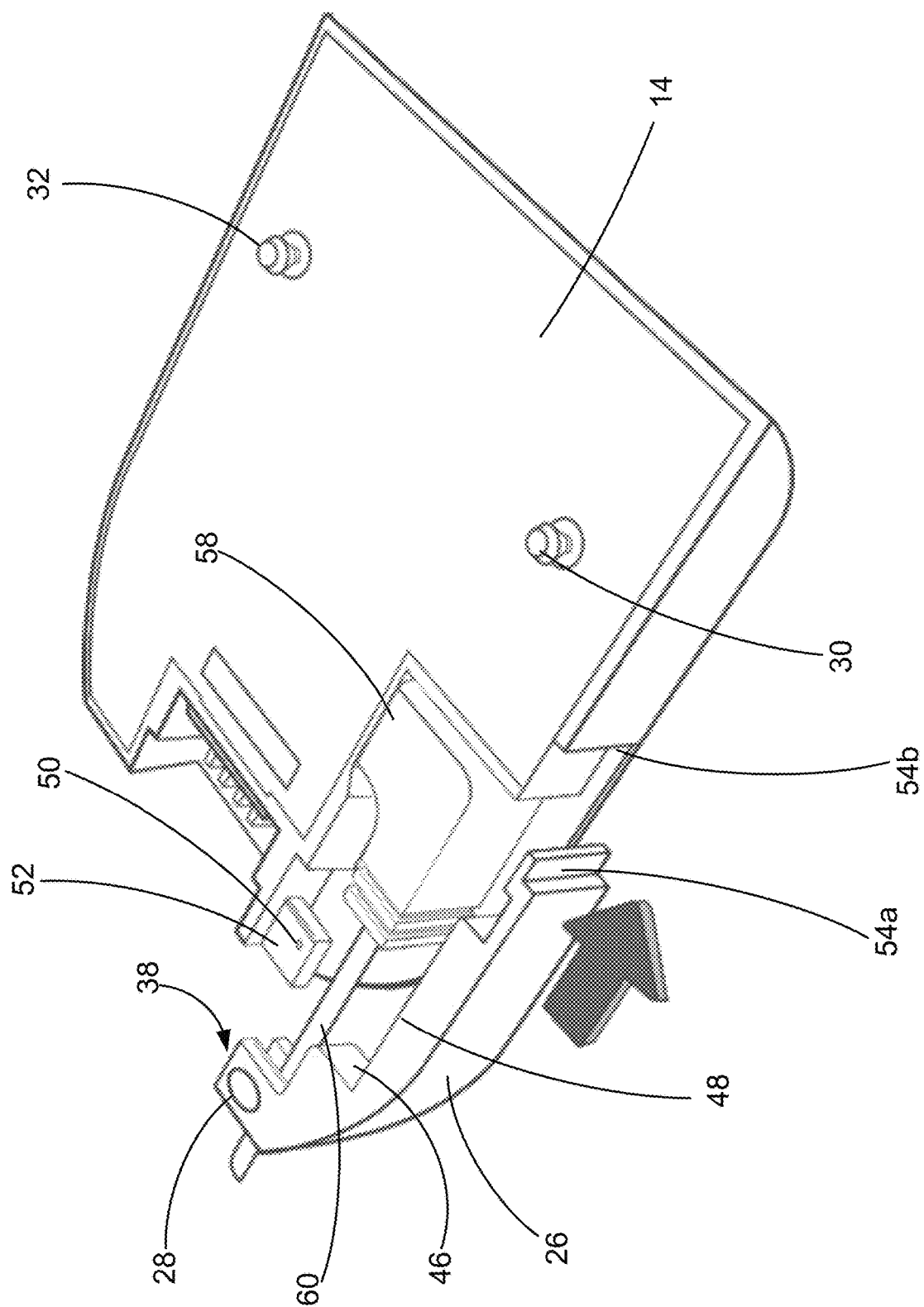
FIG. 2d illustrates a first stage of replacing the removable panel on the second part of the housing.
Figure 2E:
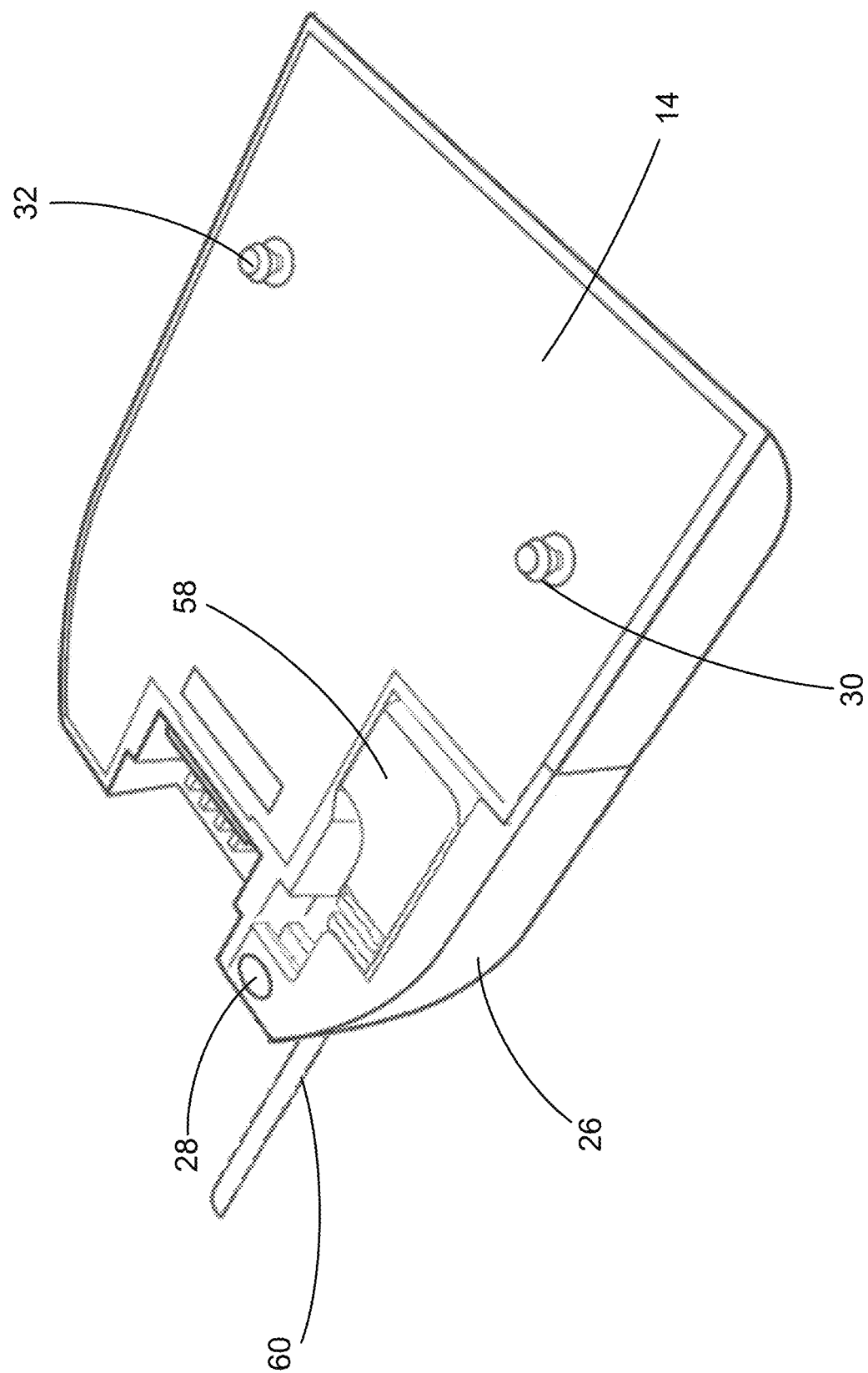
FIG. 2e illustrates a second stage of replacing the removable panel on the second part of the housing.

FIGS. 2d and 2e illustrate the second part 14 of housing 12 after the electro-mechanical connector portion 58 of power supply assembly has been coupled to the power input port of the camera and when the removable panel 26 has been returned to the cover configuration (see FIG. 2e).

As can be seen, the power cable portion 60 of the power supply assembly passes through the channel of yoke 38 (i.e. between the arms of yoke 38).

Figure 2F:
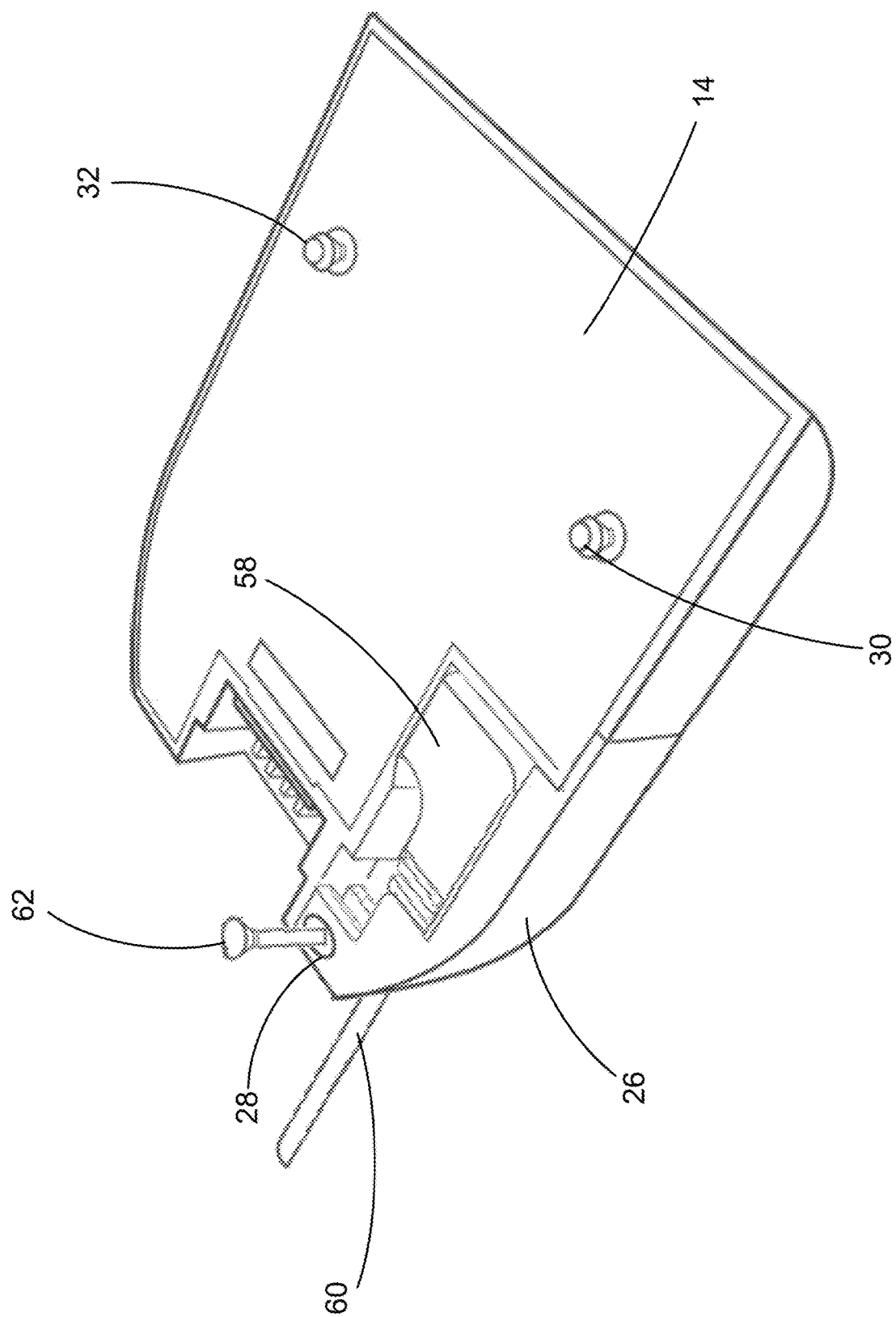
FIG. 2f illustrates a stage in coupling the removable panel to the second part of the housing.

Location of first interlocking component 54a at the second end of the removable panel 26 in second interlocking component 54b of the second part 14 of housing 12 engages the second end of the removable panel 26 with the second part 14 of housing 12. At the first end, the yoke 38 can be secured to the securing point 52 of the second part 14 of housing 12 when the aperture 28 is vertically aligned with aperture 50 (see FIG. 2e) to allow a security fastener 62 to pass through the aperture 28 into the aperture 50 (see FIG. 2f).

Security fastener 62 passes across an open end of the channel in which the power cable portion 60 can reside. In combination, the security fastener 62 and the sides of the channel formed by the arms of the yoke can restrict movement of the power cable portion 60 relative to the second part 14 of housing. These features may effectively form a cable grip, which may frustrate attempts to uncouple the power supply assembly from the camera by way of pulling, or tugging, on the power cable portion 60.

Figure 2G:
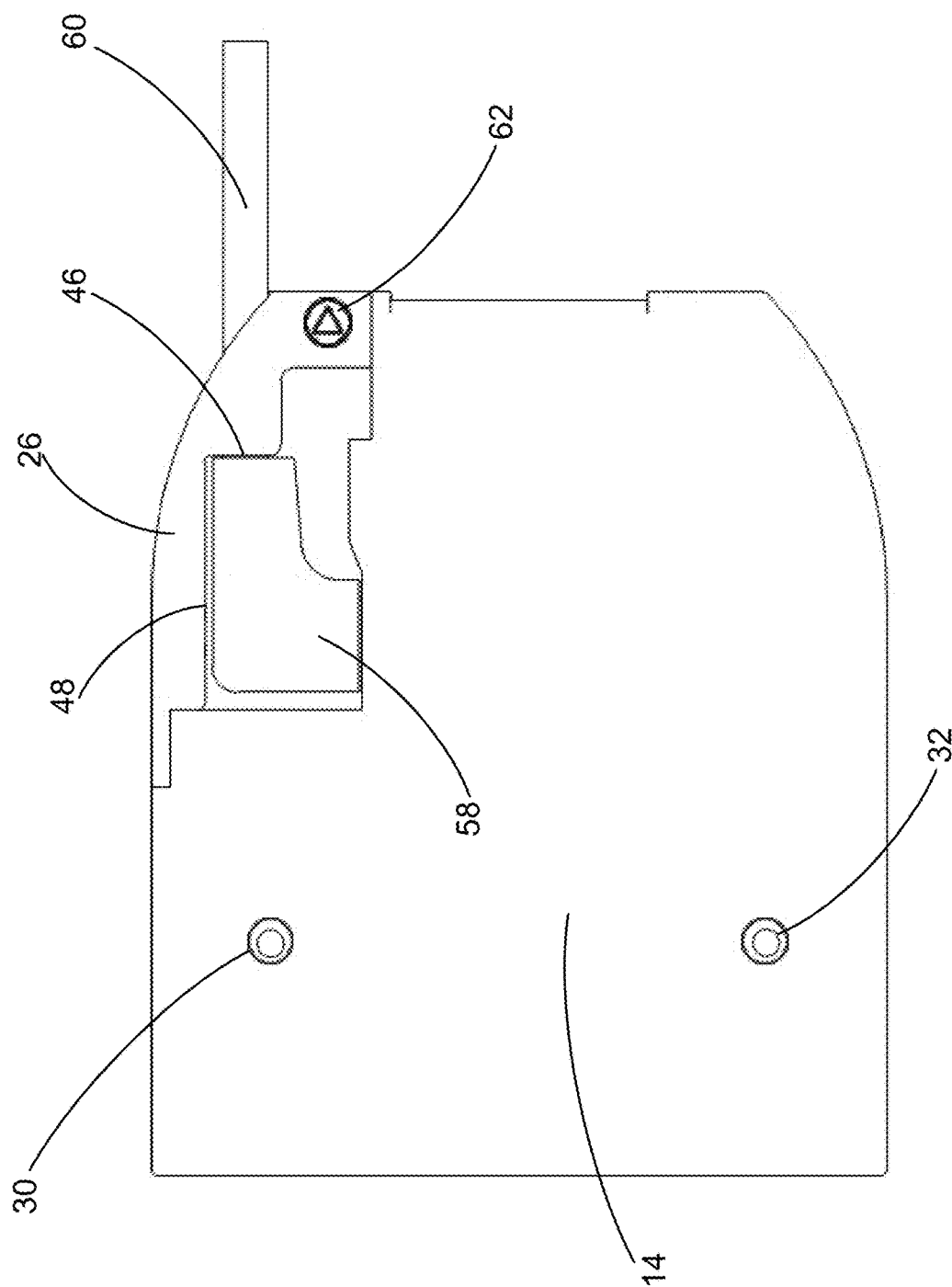
FIG. 2g illustrates the removable panel coupled to the second part of the housing in a cover configuration.

FIG. 2g illustrates a top plan view of the second part 14 of housing 12 of the camera system with the removable panel 26 in the cover configuration and in which the power supply assembly is securely held in a coupled arrangement with the second part 14 of housing 12 through secure engagement of the removable panel 26 to the second part 14 of housing 12.

As can be seen, first surface 46 of the second formation of the removable panel 26 abuts a cable-end region of the electro-mechanical connector portion 58 of power supply assembly and second surface 48 of the second formation abuts a side surface of the electro-mechanical connector portion 58. These interactions between the first and second surfaces 46, 48 of the second formation of the removable panel 26 may inhibit movement of the power supply assembly relative to the power input port of the camera and may serve to inhibit disconnection, or uncoupling, of the electro-mechanical connector portion of the power supply assembly from the power input port of the camera.

Figure 2H:
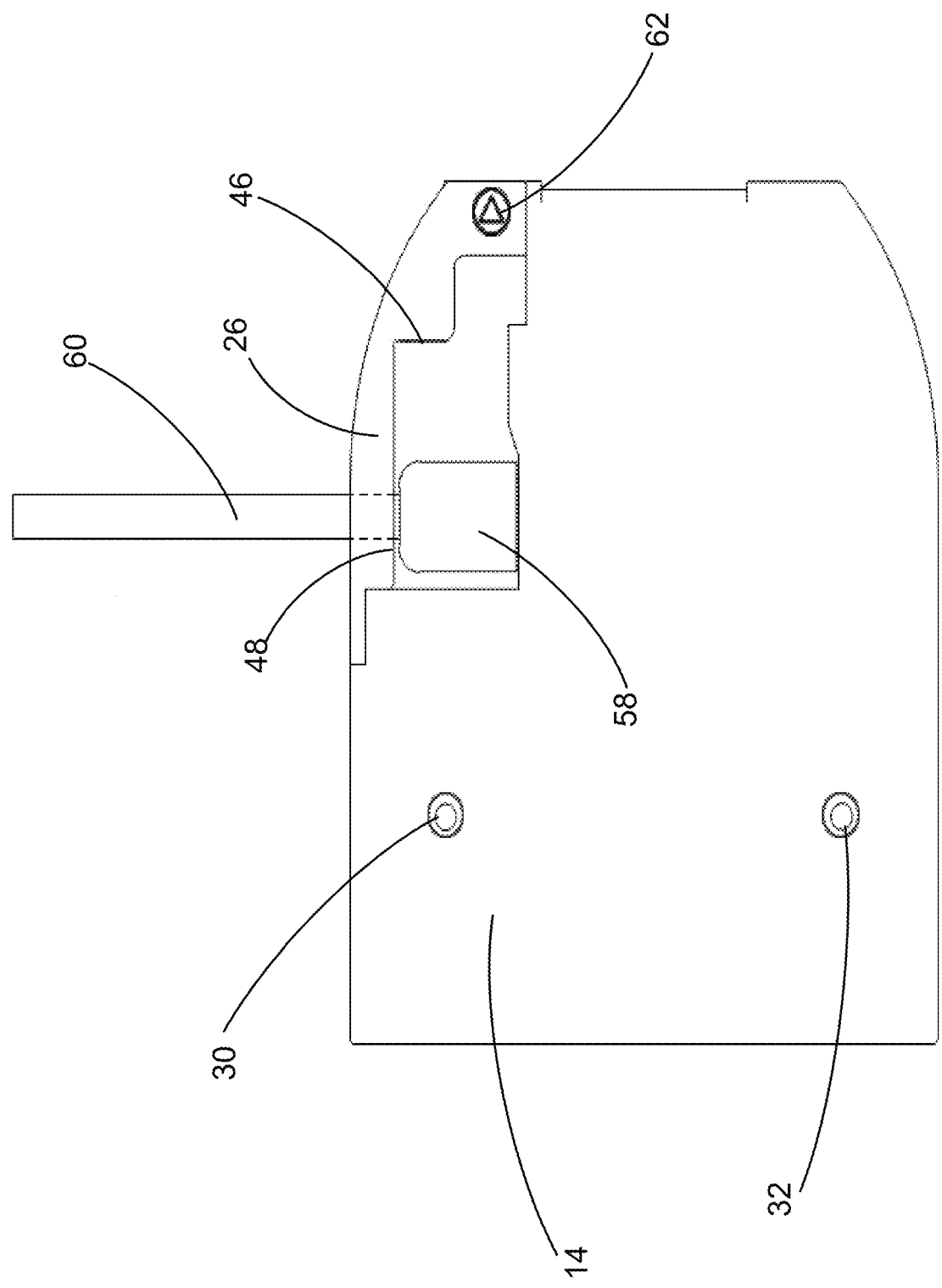
FIG. 2h illustrates the camera system and a power supply assembly of a second type coupled to the camera system in a first arrangement.
Figure 2I:
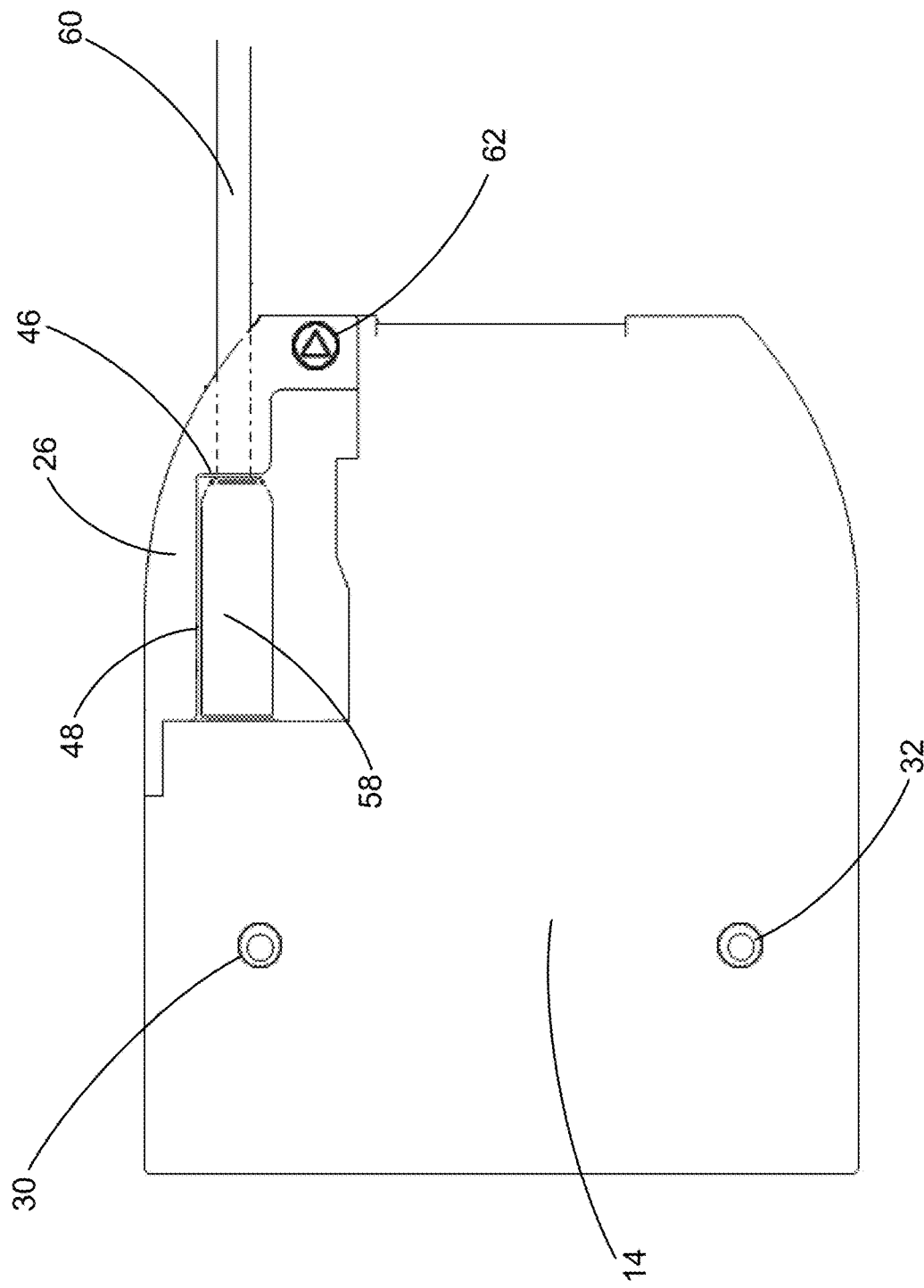
FIG. 2i illustrates the camera system and a power supply assembly of the second type coupled to the camera system in a second arrangement.

FIGS. 2h and 2i illustrate the second part 14 of the housing 12 of the camera system with the removable panel 26 in the cover configuration and in which power supply assemblies of a different type from that disclosed with reference to FIGS. 2a to 2g are employed.

In the arrangement illustrated in FIG. 2h, the second surface 48 of the second formation of the removable panel 26 may abut a cable-end region of the electro-mechanical connector portion 58 of power supply assembly. In this arrangement, disconnection, or uncoupling, of the electro-mechanical connector portion of the power supply assembly from the power input port of the camera may be inhibited by way of the second surface 48 acting on the cable-end of the electro-mechanical connector portion 58 to urge the electro-mechanical connector portion 58 into a coupled arrangement with the power input port of the camera.

In the arrangement illustrated in FIG. 2i, the first surface 46 of the second formation of the removable panel 26 may abut a cable-end region of the electro-mechanical connector portion 58 of power supply assembly. In this arrangement, disconnection, or uncoupling, of the electro-mechanical connector portion of the power supply assembly from the power input port of the camera may be inhibited by way of the first surface 46 acting on the cable-end of the electro-mechanical connector portion 58 to urge the electro-mechanical connector portion 58 into a coupled arrangement with the power input port of the camera.

FIGS. 3a to 3e illustrate another removable panel of the camera system and steps for removal of the removable panel from, and return to, a first part 13 of the housing 12 of the camera system.

Figure 3A:
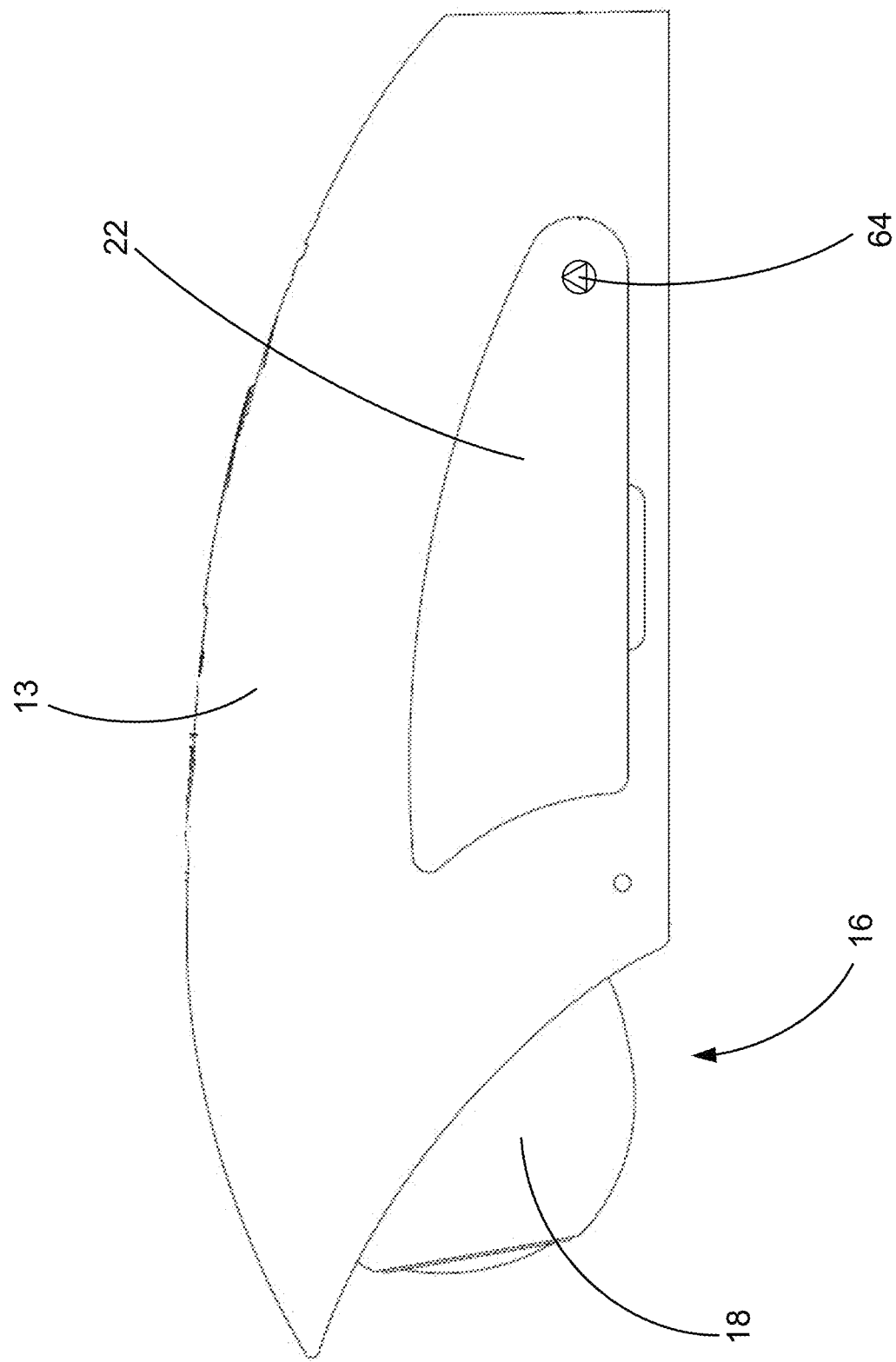
FIG. 3a illustrates another removable panel of a housing of the camera system coupled to a first part of the housing in a cover configuration.

FIG. 3a illustrates a side view of a first side of the first part 13 of housing 12 of the camera system with removable panel 22 in a cover configuration, i.e. securely attached to first part 13 of the housing 12 to cover an opening in the housing.

Removable panel 22 comprises an aperture for receiving therethrough a security fastener 64, which extends through aperture 66 (see FIG. 3b) in removable panel 22 to be received in an aperture 68 (see FIG. 3b) in the first part 13 of the housing. The security fastener 64 serves to securely attach the removable panel 22 to the first part 13 of the housing in a cover configuration.

Figure 3B:
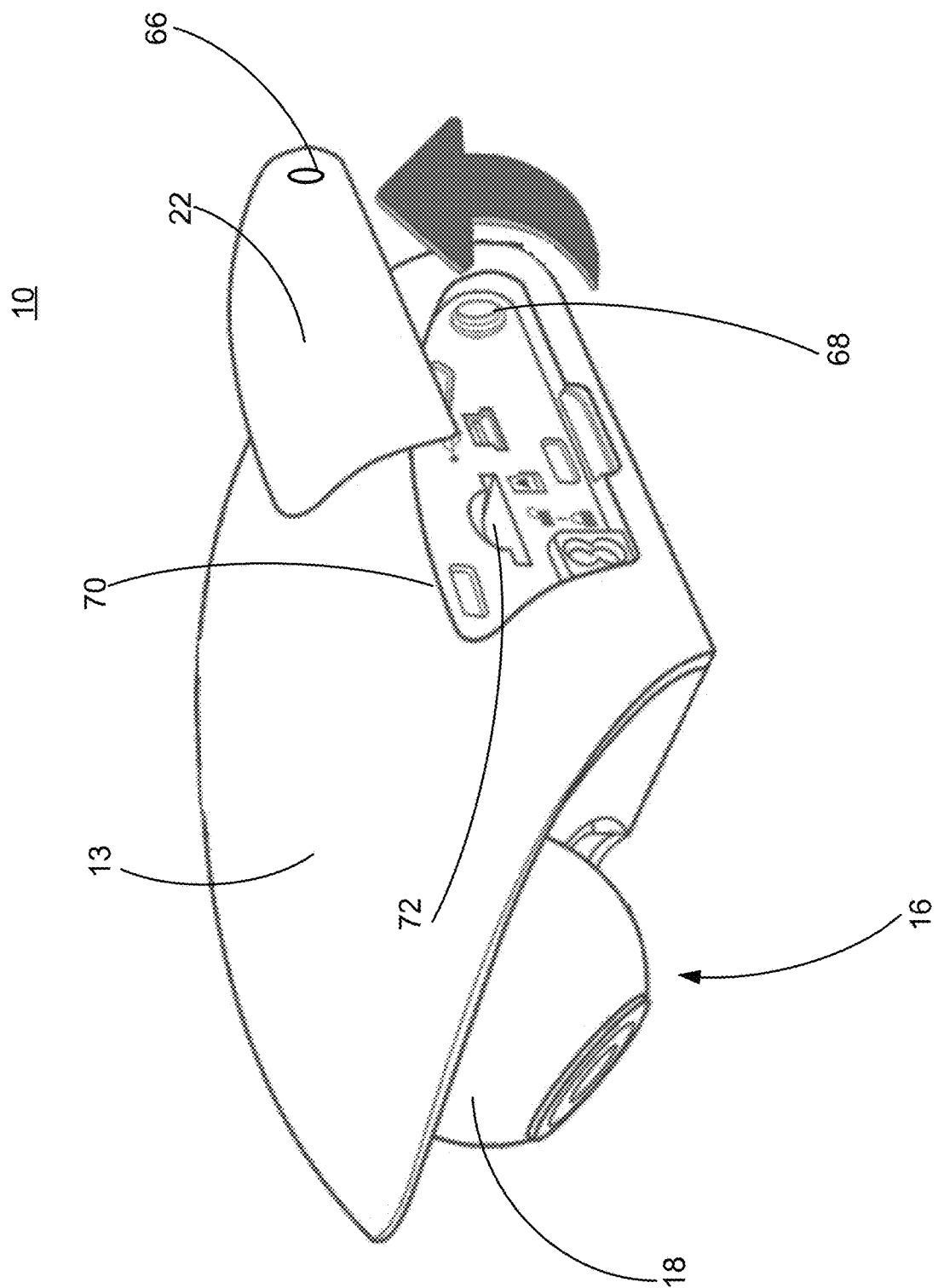
FIG. 3b illustrates a stage of removing the another removable panel from the first part of the housing.

FIG. 3b illustrates a perspective side view of the first side of the first part 13 of the housing of the camera system with security fastener removed, to allow removal of removable panel 22 from the first part 13 of the housing in order to uncover an opening 70 in the first part 13 of the housing. The opening 70 provides access to components of the camera housed within the first part 13 of the housing. In particular, one of the components accessible via opening 70 comprises a data storage device port 72 for receiving a removable data storage device.

Figure 3C:
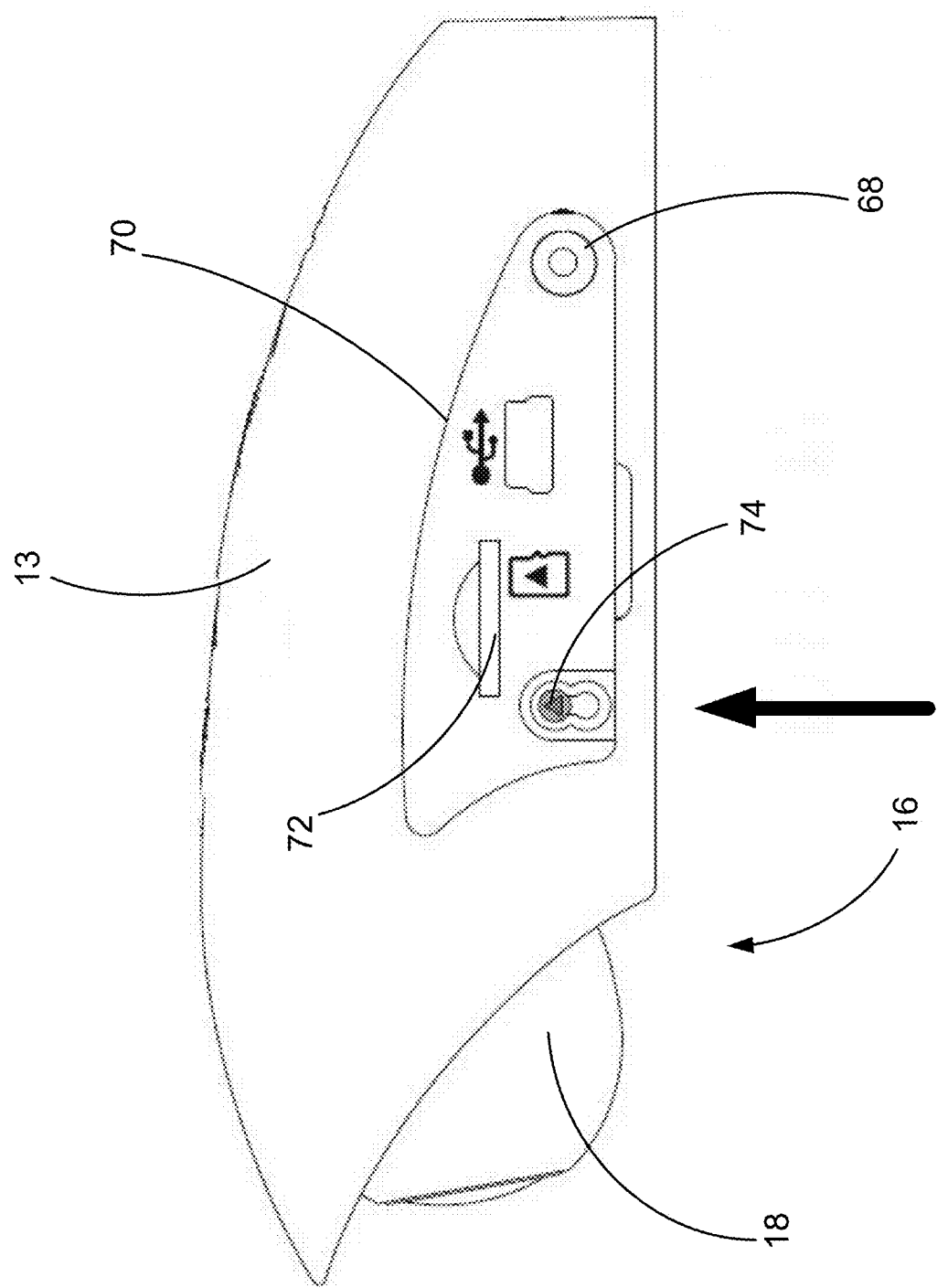
FIG. 3c illustrates the first part of the housing with the another removable panel removed.

FIG. 3c illustrates a side view of the first side of the first part 13 of the housing of the camera system with removable panel 22 removed.

In the view illustrated in FIG. 3c, there can be seen a security fastener 74, which extends into a body of the part of the camera located in the first part 13 of housing through an aperture formed in a side of that part of the camera. The security fastener 74 is configured to lock the first part 13 of housing 12 (and the parts of the camera located therein) to the second part 14 of housing 12 (and the other parts of the camera mounted therein) via interaction of security fastener 74 with coupling element 32 of second part 14 of housing.

Coupling element 32 of second part 14 of the housing can enter the first part 13 of housing in a direction indicated by the arrow in FIG. 3c via an aperture in the underside of the first part 13 of the housing. The fastener 74 interacts with the coupling element 32 transversely.

Figure 3D:
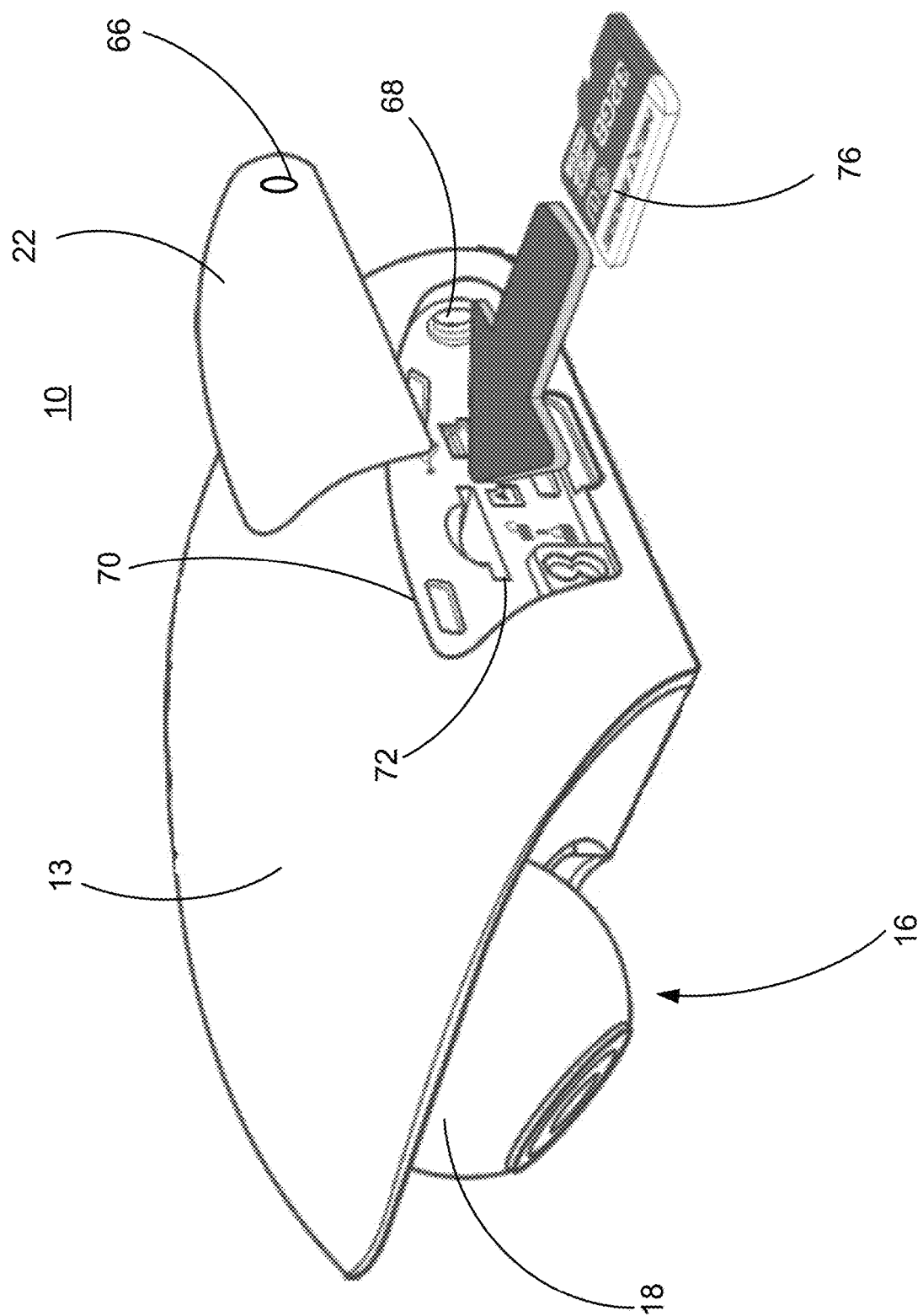
FIG. 3d illustrates the first part of the housing with the another removable panel removed and a step for inserting a removal data storage device.

FIG. 3d illustrates a perspective side view of the first side of the first part 13 of the housing of the camera system with removable panel 22 removed to allow a data storage device 76 (e.g. an SD card) to be inserted into the data storage device port 72.

Figure 3E:
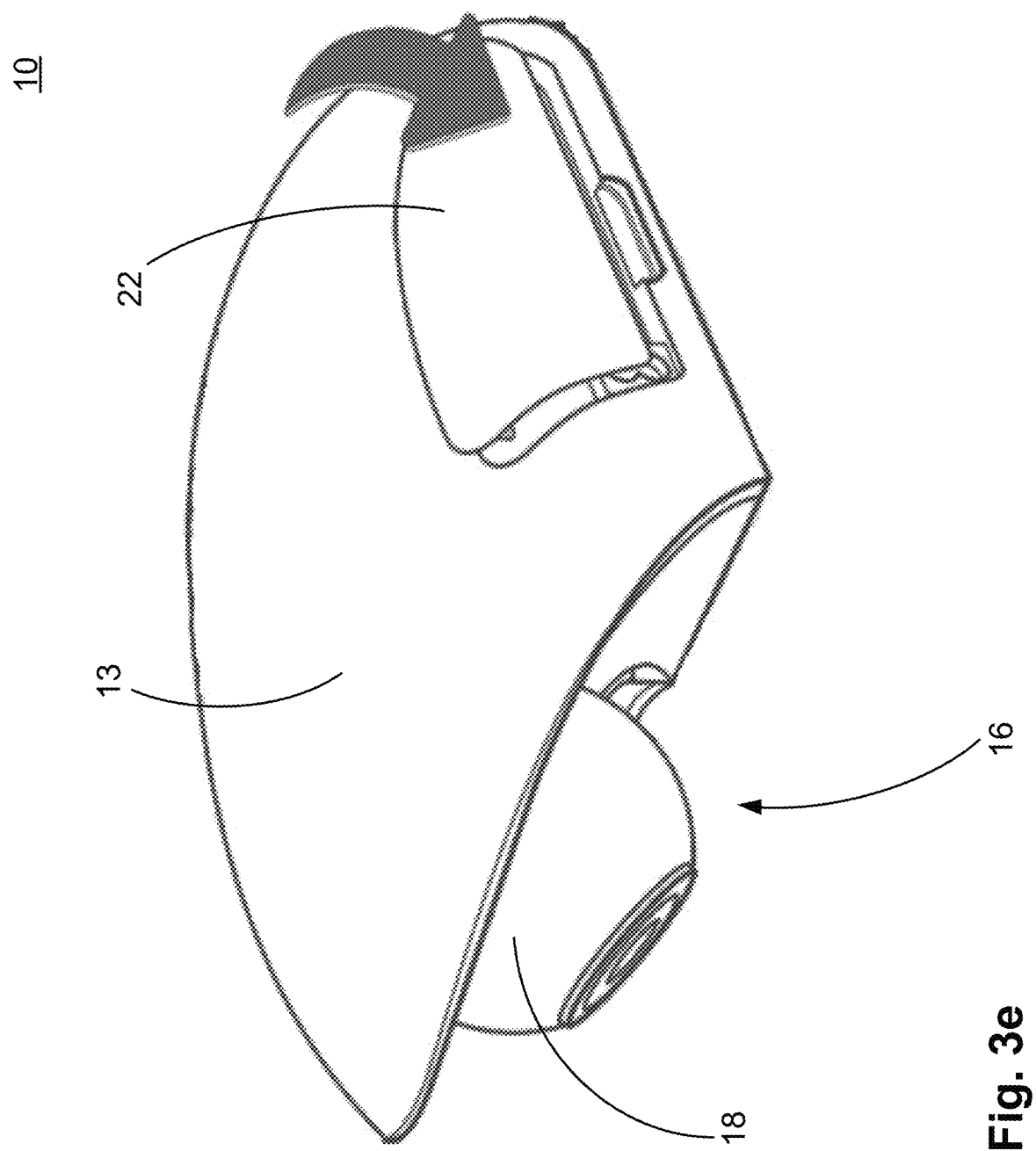
FIG. 3e illustrates a stage in returning the another removable panel to the cover configuration with respect to the first part of the housing.

FIG. 3e illustrates a perspective side view of the first side of the first part 13 of the housing of the camera system with removable panel 22 being returned to a position in which the opening in the first side of the first part is covered (i.e. the removable panel 22 is in a cover configuration.

FIGS. 4a to 4d illustrate a further removable panel of the camera system and steps for removal of the removable panel from, and return to, a first part 13 of the housing of the camera system.

Figure 4A:
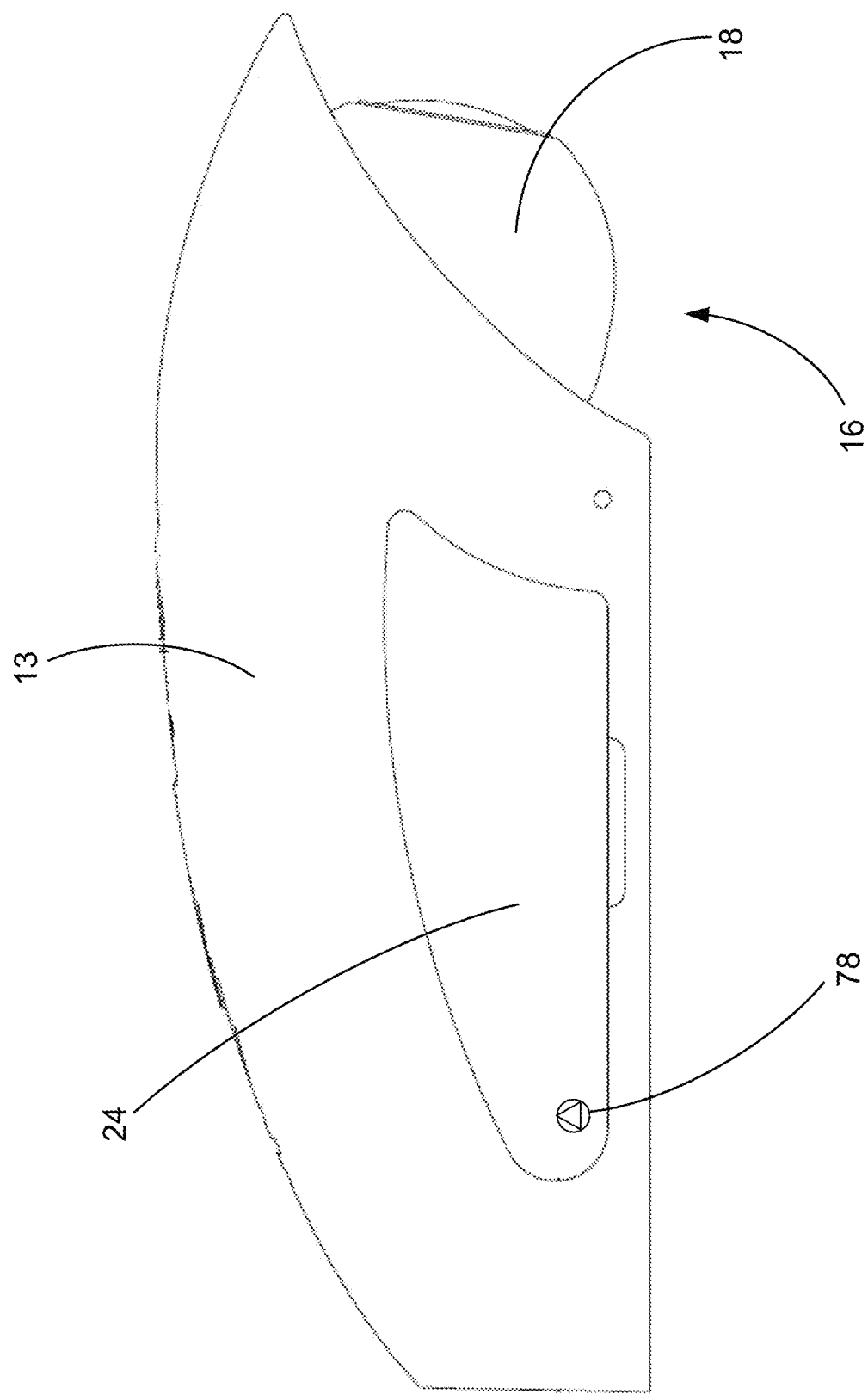
FIG. 4a illustrates a further removable panel of a housing of the camera system coupled to the first part of the housing in a cover configuration.

FIG. 4a illustrates a side view of a second side of the first part 13 of housing 12 of the camera system with removable panel 24 in a cover configuration, i.e. securely attached to first part 13 of the housing 12 to cover an opening in the housing.

Removable panel 24 comprises an aperture for receiving therethrough a security fastener 78, which extends through aperture 80 (see FIG. 4b) in removable panel 22 to be received in an aperture 82 (see FIG. 4b) in the first part 13 of the housing. The security fastener 64 serves to securely attach the removable panel 24 to the first part 13 of the housing in a cover configuration.

Figure 4B:
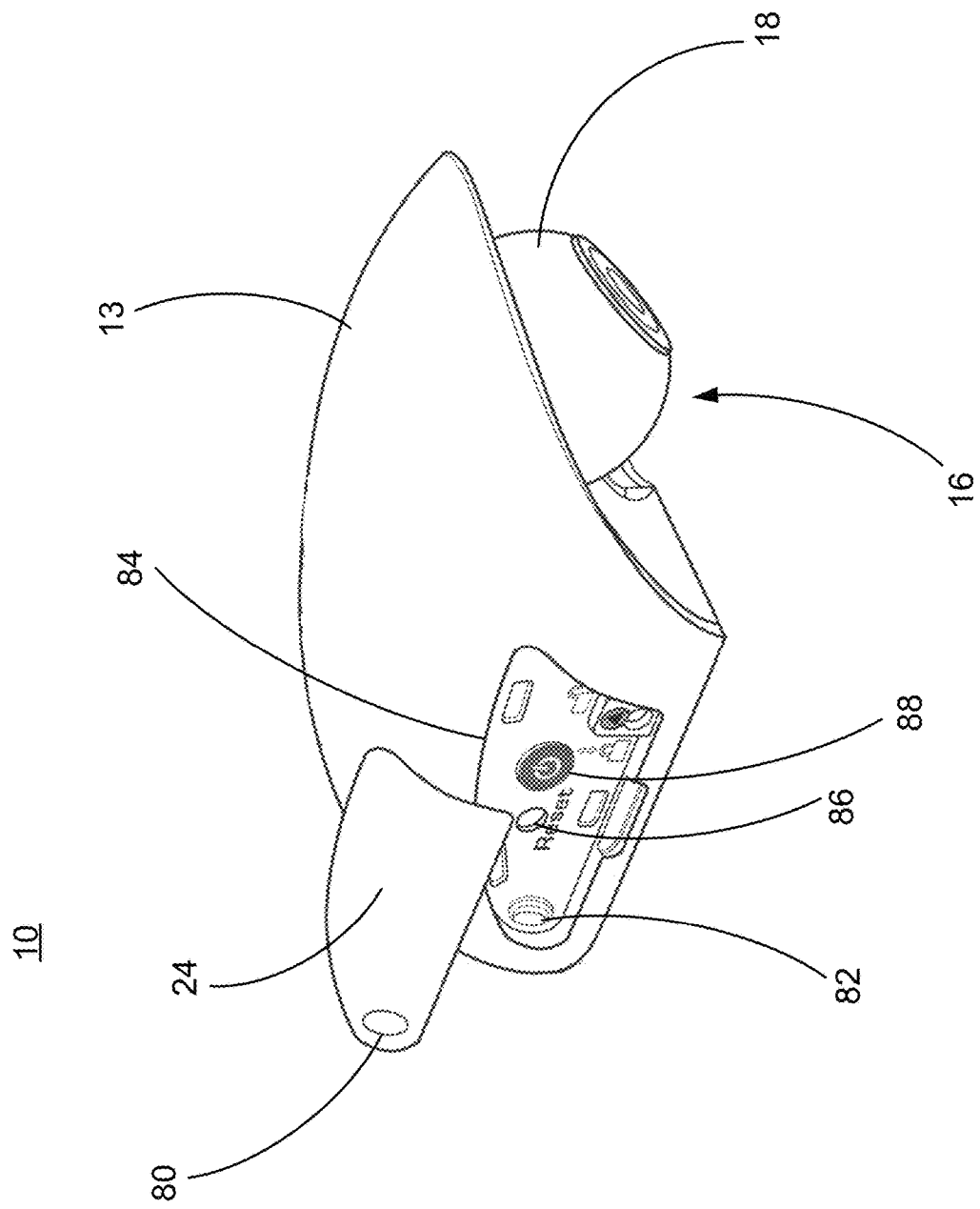
FIG. 4b illustrates a stage of removing the further removable panel from the first part of the housing.

FIG. 4b illustrates a perspective side view of the first side of the first part 13 of the housing of the camera system with security fastener removed, to allow removal of removable panel 24 from the first part 13 of the housing in order to uncover an opening 84 in the first part 13 of the housing. The opening 84 provides access to components of the camera housed within the first part 13 of the housing. In particular, some of the components accessible via opening 84 comprise a reset button 86 and a power button 88 (e.g. an on/off button).

Figure 4C:
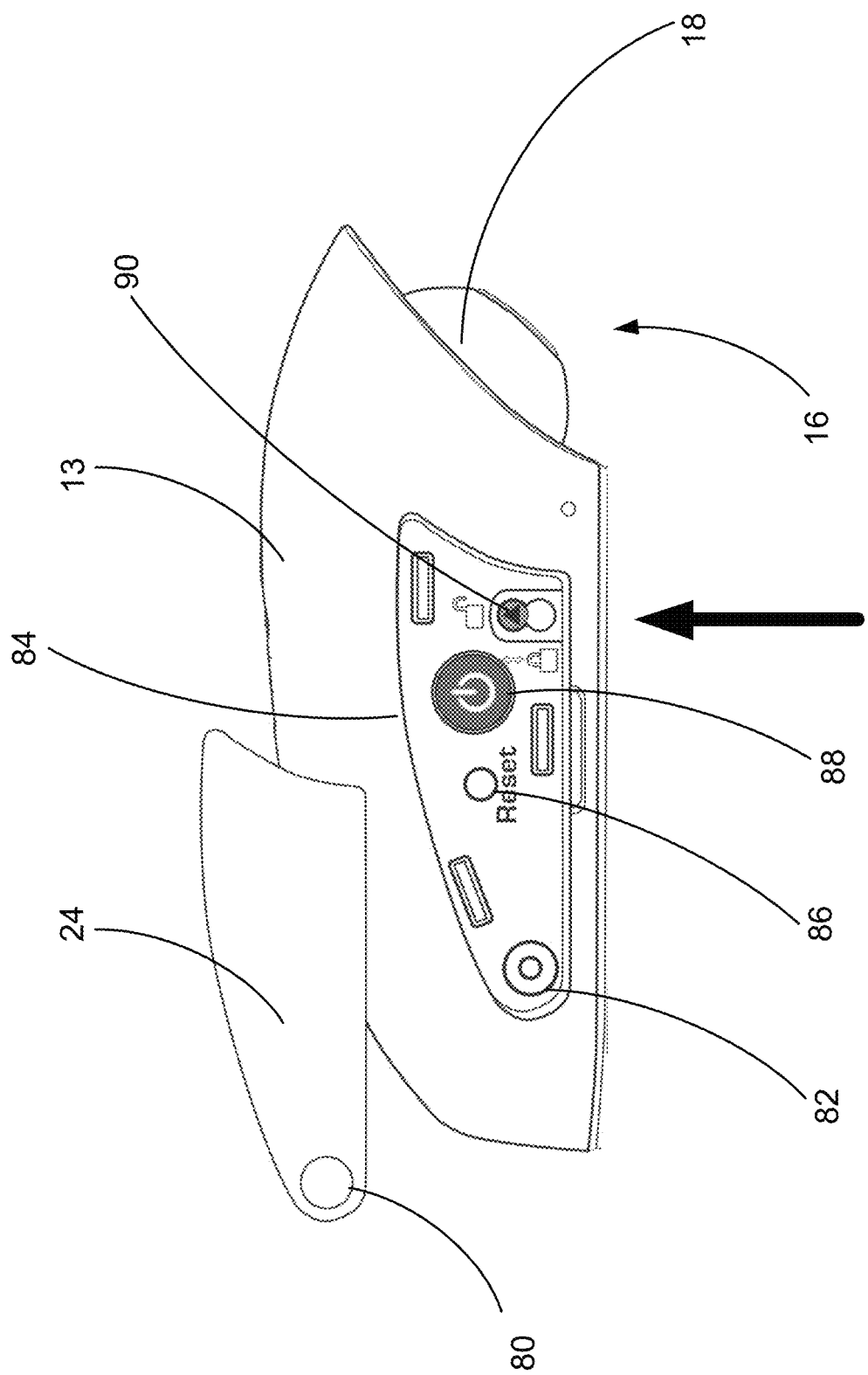
FIG. 4c illustrates the first part of the housing with the further removable panel removed.

FIG. 4c illustrates a side view of the second side of the first part 13 of the housing of the camera system with removable panel 24 removed.

In the view illustrated in FIG. 4c, there can be seen a security fastener 90, which extends into a body of the part of the camera located in the first part 13 of housing through an aperture formed in a side of that part of the camera. The security fastener 90 is configured to lock the first part 13 of housing 12 (and the parts of the camera located therein) to the second part 14 of housing 12 (and the other parts of the camera mounted therein) via interaction of security fastener 90 with coupling element 30 of second part 14 of housing.

Coupling element 30 of second part 14 of the housing can enter the first part 13 of housing in a direction indicated by the arrow in FIG. 4c via an aperture in the underside of the first part 13 of the housing. The fastener 90 interacts with the coupling element 30 transversely.

Figure 4D:
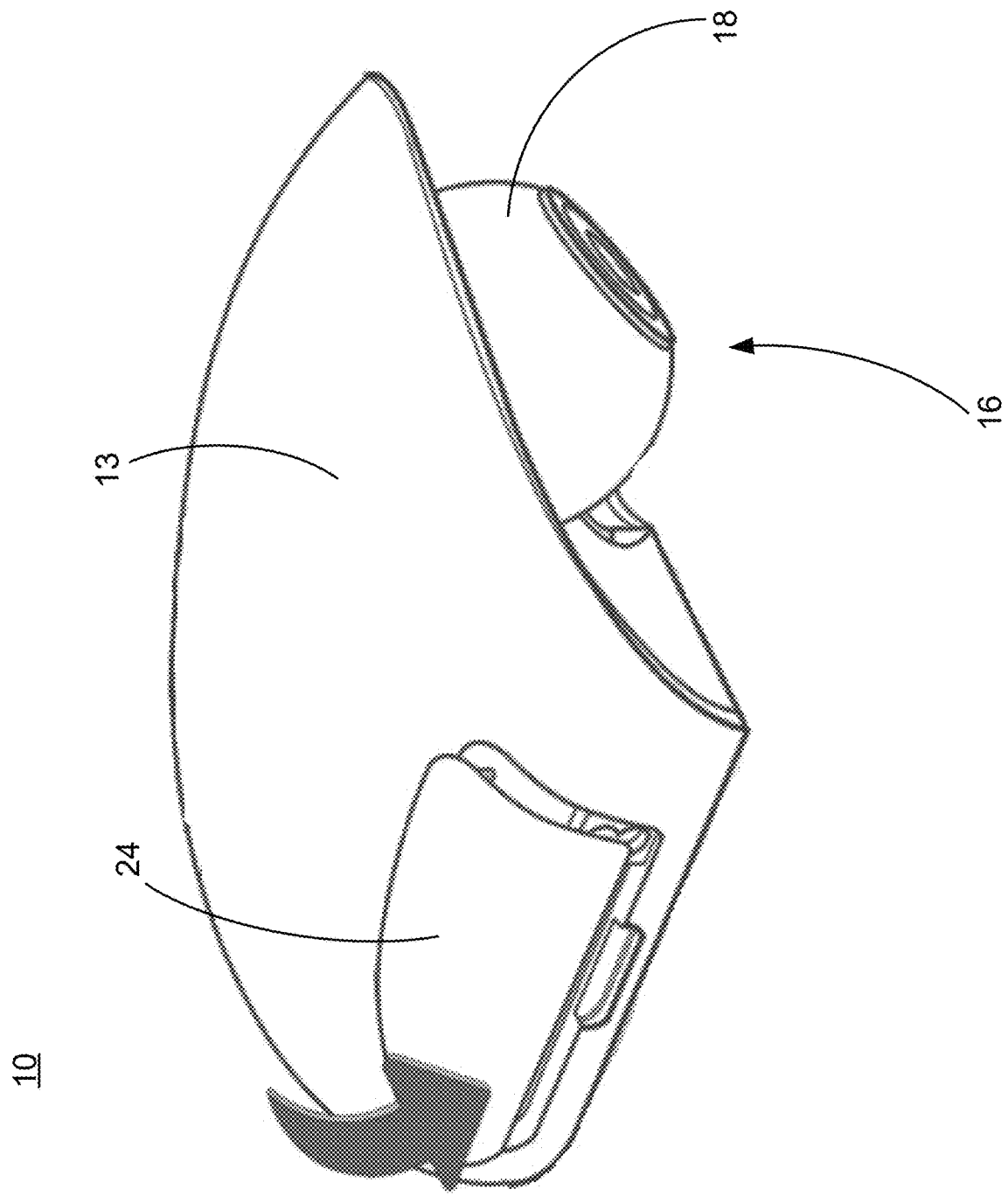
FIG. 4d illustrates a stage in returning the further removable panel to the cover configuration with respect to the first part of the housing.

FIG. 4d illustrates a perspective side view of the second side of the first part 13 of the housing of the camera system with removable panel 24 being returned to a position in which the opening in the second side of the first part is covered (i.e. the removable panel 24 is in a cover configuration.

Figure 5:
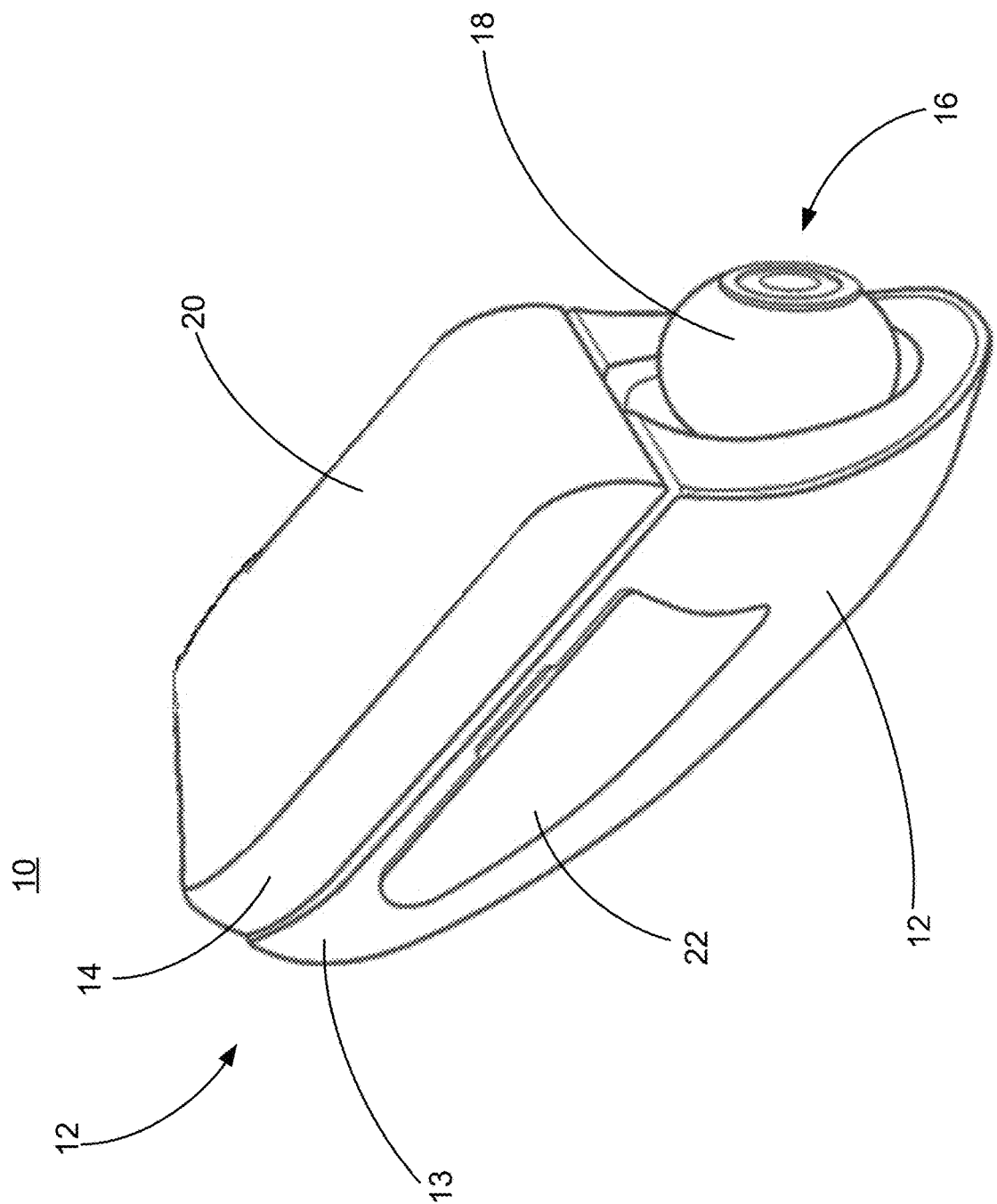
FIG. 5 illustrates the camera system in a typical orientation for mounting to an inside of a vehicle windscreen.

FIG. 5 illustrates the camera system 10 in a typical orientation for mounting to an inside of a vehicle windscreen. The surface 20 of the second part 14 of housing 12 can be provided with an adhesive substrate thereon to provide a bonding medium to bond the camera system 10 to the inside of a vehicle windscreen.

Figure 6:
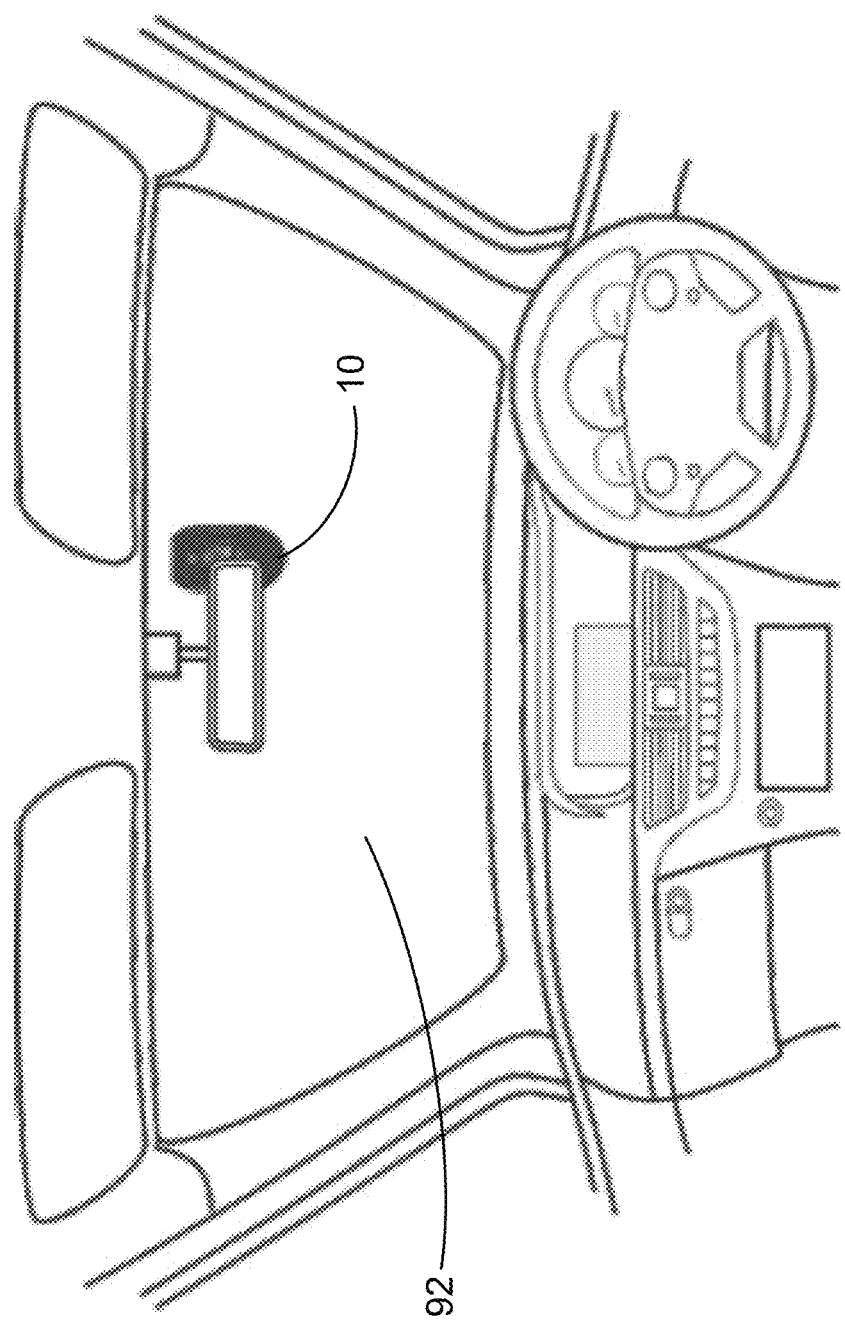
FIG. 6 illustrates the camera system according to one or more embodiments of the present invention located in a vehicle.

FIG. 6 illustrates the camera system 10 according to one or more embodiments of the present invention located in a vehicle. The camera system 10 is bonded to an inside of a windscreen 92 of the vehicle. A power cable for providing power to the camera system 10 is not shown.

In the above described one or more embodiments, a particular series and sequence of steps is required to remove a data storage device and uncouple the camera system from the power supply assembly. Specifically, both panels 22 and 24 must be removed (using a special tool compatible with the security fasteners coupling those panels to first part 12 of housing 13). The data storage device can be removed at this stage.

To uncouple the power supply assembly from the camera system, the first part 13 of the housing must first be removed from the second part 14. This is achieved by actuating security fasteners 74 and 90 to cause disengagement of the engagement elements in the first part and second part that engage to couple the two parts together. Again a special tool compatible with the security fasteners 74 and 90 is required. Once the first part 13 is removed from the second part 14 to uncover the second part 14, security fastener 62 must be actuated (again using a special tool compatible with fastener 62) to permit panel 26 to be uncoupled from the second part 14 of housing 12. With the panel 26 removed, the cable can then be removed.

These steps and/or their sequence may frustrate attempts to tamper with the camera system (e.g. to prevent data relating to a user's driving behaviour being captured and/or to damage or erase existing captured data), whether that be an attempt to remove a data storage device or interfere with the storage device, or data stored thereon, or an attempt to uncouple the camera system from a power source.

In the above described one or more embodiments, the housing 12 comprises a housing of two parts: a first part 13; and a second part 14, with some parts of the camera located in the first part 13 and other parts of the camera located in the second part 14. However, in an optional arrangement, the housing 12 may comprise a single unit housing all components of the camera therein.

In the above described one or more embodiments, security fasteners 62, 64, 74, 78 and 90 may all be of the same type. However, optionally, each one may be of a different type to the others. Further optionally, some may be of the same type as some others, but the remainder may differ.

In the above described one or more embodiments, removable panels 22 and 24 have respective apertures 66 and 80 through which security fasteners 64 and 78 can extend to secure the removable panels 22 and 24 to first part 13 of housing 12. However, in an optional arrangement, the removable panels 22 and 24 may have no apertures and may be attachable to the first part 13 of the housing 12 by cooperative engagement of complementary engagement elements on the removable panels 22 and 24 on the first part 13 of housing 12, e.g. a snap-fit arrangement. This optional arrangement may be employed where removable panels 22 and 24 are not required to be made secure.

In the above described one or more embodiments, security fasteners 62, 64 and 78 are received in apertures 50, 68 and 82 respectively of the housing 12. The apertures 50, 68 and 82 may comprise a threaded bore for cooperative engagement with a corresponding threaded shaft of respective security fasteners 62, 64 and 78. Also, the apertures for receiving security fasteners 74 and 90 may also comprise a threaded bore for cooperative engagement with a corresponding threaded shaft of respective security fasteners 74 and 90.

In the above described one or more embodiments, the interaction of the security fasteners and respective apertures into which they are received comprises a male-fastener, female aperture arrangement. However, in an optional arrangement, the arrangement may be reversed such that a male element extends from the housing to extend through the apertures in the panels, onto which can be coupled a female element (e.g. a locking nut and/or a nut having a head with a security feature). A mixture of fastener types may be employed, e.g. some male fastener-female receiver arrangements and some female fastener-male element arrangements. Optionally, the security fastener may be a security screw and/or a security bolt.

In the above described one or more embodiments, security fasteners 64 and 78 extend through removable panels 22 and 24 to secure the removable panels 22 and 24 to first part 13 of housing 12. However, in an optional arrangement, the removable panels 22 and 24 may have no apertures and may be attachable to the first part 13 of the housing 12 by cooperative engagement of complementary engagement elements on the removable panels 22 and 24 on the first part 13 of housing 12, e.g. a snap-fit arrangement. This optional arrangement may be employed where removable panels 22 and 24 are not required to be made secure.

In the above described one or more embodiments, the camera system comprises a port for receiving a removable data storage device. Optionally, the camera system may comprise an integral data storage device in addition to a port for receiving a removable data storage device. Further optionally, the camera system may comprise an integral data storage device instead of a port for receiving a removable data storage device.

Having different security fasteners means that multiple different tools are required in order to removal all of them, e.g. a different tool for each fastener. This may further frustrate attempts to tamper with the camera system.

In this description the term "security fastener" is used to invoke a concept of a fastening component that can inhibit removal. The fastener may typically be a screw-type component with a head having non-standard actuation formations. The term "non-standard" is used to convey that a special tool is required to drive the fastener—i.e. not just a slot in the head of the fastener that can accommodate any blade (e.g. a flat-head screwdriver), nor a cross-recess head (e.g. Phillips® or Pozidriv® head), or a hexagonal head or aperture, for accommodating tools having those types of head. All fasteners having heads of this type are ubiquitous and so are the tools for them. Instead the fasteners may have heads with, obscure, non-standard, tamper-inhibiting formations such as, for example: a Bristol spline screw drive formation; a line screw drive formation; a one-way screw drive formation; a pentalobe screw drive formation; a poly-drive screw drive formation; a protruding obstacle screw drive formation; spanner screw drive formation; 12-spline flange screw drive formation; cruciform screw drive formation; TA screw drive formation; TP3 screw drive formation; tri-point screw drive formation; tri-groove screw drive formation; and/or a tri-wing screw drive formation.

All references made herein to orientation (e.g. top, bottom, etc.) are made for the purposes of describing relative spatial arrangements of features, and are not intended to be limiting in any sense.

It will be understood by those skilled in the art that the drawings are merely diagrammatic and that further items of equipment may be required in a commercial apparatus. The position of such ancillary items of equipment forms no part of the present invention and is in accordance with conventional practice in the art.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention.

The scope of the present disclosure includes any novel feature or combination of features disclosed therein either explicitly or implicitly or any generalization thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A camera system, comprising:
a camera operative to capture an image, said camera comprising a power input port for coupling to a power supply assembly and a data storage device port for receiving a removable data storage device;

a housing for supporting said camera, said housing comprising a first opening and a second opening, wherein said first opening is arranged to provide access to said data storage device port and said second opening is arranged to provide access to said power input port;

a first removable panel engageable to said housing to cover said first opening by a first security fastener to secure said first removable panel to said housing in a cover configuration; and a second removable panel engageable to said housing to cover said second opening by a second security fastener to secure said second removable panel to said housing in said cover configuration, said second removable panel comprising a formation for engaging with a portion of said power supply assembly in said cover configuration to restrain movement of said power supply assembly to maintain a coupled arrangement of said power supply assembly and said power input port in said cover configuration;

wherein said housing further comprises a third opening arranged to provide access to a camera control button of said camera, and further wherein said camera system comprises a third removable panel engageable to said housing to cover said third opening by a third security fastener to secure said third removable panel to said housing in said cover configuration; and wherein said housing comprises a first part and a second part and wherein said third opening and said camera control button are located in said first part of said housing.

2. A camera system according to claim 1, wherein said first part of said housing is coupleable to said second part of said housing by cooperative engagement of a complementary engagement element on said first part and on said second part;

wherein said first part is securely coupleable to said second part by way of at least one security fastener configured to interact with said complementary engagement element on said first part and said second part; and wherein said at least one security fastener is insertable into said first part via said first opening to interact with said complementary engagement element.

3. A camera system according to claim 1, wherein at least one security fastener is insertable into said first part via said third opening to interact with said complementary engagement elements and wherein said at least one security fastener is insertable into said first part via said first opening to interact with said complementary engagement element.

4. A camera system according to claim 1, wherein said first security fastener to secure said first removable panel to said housing in said cover configuration and said second security fastener to secure said second removable panel to said housing in said cover configuration comprise different non-standard actuation formations; and wherein said housing further comprises a third opening arranged to provide access to camera control buttons of said camera, and further wherein said camera system comprises a third removable panel engageable to said housing to cover said third opening by a security fastener to secure said third removable panel to said housing in a cover configuration, and wherein said third security fastener to secure said third removable panel to said housing in said cover configuration comprises a different non-standard actuation formation to that of said security fastener to secure at least one selected from a group consisting of: said first removable panel to said housing in said cover configuration, and said second removable panel to said housing in said cover configuration.

5. A camera system according to claim 1, wherein said first part of said housing is coupleable to said second part of said housing by cooperative engagement of a complementary engagement element on said first part and on said second part;

wherein said first part is securely coupleable to said second part by way of at least one security fastener configured to interact with said complementary engagement element on said first part and said second part; and wherein said first part is securely coupleable to said second part by way of at least one security fastener configured to interact with complementary engagement elements on said first part and said second part and, wherein said at least one security fastener configured to interact with said complementary engagement element on said first part and said second part comprises a different nonstandard actuation formation to at least one selected from a group consisting of: said first security fastener to secure said first removable panel to said housing in said cover configuration, said second security fastener to secure said second removable panel to said housing in said cover configuration, and a third security fastener to secure a third removable panel to said housing in said cover configuration.

6. A camera system according to claim 5, wherein a first one of said at least one security fasteners configured to interact with said complementary engagement element on said first part and said second part comprises a different non-standard actuation formation to that of a second one of said at least one security fasteners configured to interact with said complementary engagement element on said first part and said second part.

7. A camera system according to claim 1, wherein at least one of said first and second removable panels is engageable to said housing to cover at least one selected from a group consisting of: said first opening and second opening, by cooperative engagement of a complementary engagement element on said at least one of said first and second removable panels and on said housing.

8. A camera system according to claim 7, wherein said housing further comprises a third opening arranged to provide access to camera control buttons of said camera, and further wherein said camera system comprises a third removable panel engageable to said housing to cover said third opening by a security fastener to secure said third removable panel to said housing in a cover configuration, and wherein said third removable panel is engageable to said housing to cover said third opening by cooperative engagement of a complementary engagement element on said third removable panel and on said housing.

* * * * *